US008914777B2

(12) United States Patent
Lindahl et al.

(10) Patent No.: US 8,914,777 B2
(45) Date of Patent: *Dec. 16, 2014

(54) FORWARD POST-EXECUTION SOFTWARE DEBUGGER

(75) Inventors: Michael Lindahl, Santa Barbara, CA (US); Andre Yew, Santa Barbara, CA (US); Mallory Morgan Green, II, Santa Barbara, CA (US); Michael Johnson, Goleta, CA (US); Allan Craig Franklin, Santa Barbara, CA (US); Daniel O'Dowd, Santa Barbara, CA (US); Neil Puthuff, Ladera Ranch, CA (US)

(73) Assignee: Green Hills Software, Santa Barbara, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/590,030

(22) Filed: Aug. 20, 2012

(65) Prior Publication Data

US 2012/0317550 A1    Dec. 13, 2012

Related U.S. Application Data

(63) Continuation of application No. 10/897,757, filed on Jul. 23, 2004, now Pat. No. 8,271,955.

(51) Int. Cl.
*G06F 9/44* (2006.01)
*G06F 11/00* (2006.01)
*G06F 11/36* (2006.01)

(52) U.S. Cl.
CPC ........ *G06F 11/3636* (2013.01); *G06F 11/3656* (2013.01)
USPC ............................. 717/129; 717/127; 714/45

(58) Field of Classification Search
None
See application file for complete search history.

(56) References Cited

U.S. PATENT DOCUMENTS

| | | |
|---|---|---|
| 4,636,940 A | 1/1987 | Goodwin, Jr. |
| 5,047,923 A | 9/1991 | Elstner et al. |
| 5,053,949 A | 10/1991 | Allison et al. |
| 5,121,501 A | 6/1992 | Baumgartner |
| 5,132,971 A | 7/1992 | Oguma et al. |
| 5,165,027 A | 11/1992 | Krauskopf |
| 5,274,811 A | 12/1993 | Borg |

(Continued)

OTHER PUBLICATIONS

Marathe et al. METRIC: Tracking Down Inefficiencies in the Memory Hierarchy via Binary Rewriting. Proceedings of the International Symposium on Code Generation and Optimization, 2003, pp. 289-300, Retrieved on [Oct. 16, 2014] Retrieved from the Internet: URL<http://ieeexplore.ieee.org/xpls/abs_all.jsp?arnumber=1191553&tag=1>.*

(Continued)

*Primary Examiner* — Tuan Q. Dam
*Assistant Examiner* — Cheneca Smith
(74) *Attorney, Agent, or Firm* — Barcelo, Harrison & Walker, LLP

(57) ABSTRACT

A method and system debug a computer program by using trace data, which is a recording of the sequence of machine instructions executed by a program during a time period along with the addresses and values of memory locations accessed and modified by each machine instruction. After the time period, the method and system use the trace data to simulate the execution of the program during the time period under the control of a debugger. In addition, the method and system use the trace data to simulate the execution of the program during the time period backwards in time under the control of the debugger.

51 Claims, 13 Drawing Sheets

(56) References Cited

U.S. PATENT DOCUMENTS

| | | | |
|---|---|---|---|
| 5,321,828 A | 6/1994 | Phillips et al. | |
| 5,386,565 A | 1/1995 | Tanaka et al. | |
| 5,450,586 A | 9/1995 | Kuzara | |
| 5,603,047 A | 2/1997 | Caulk | |
| 5,611,043 A | 3/1997 | Even et al. | |
| 5,732,210 A | 3/1998 | Buzbee | |
| 5,784,552 A | 7/1998 | Bishop et al. | |
| 5,805,792 A | 9/1998 | Swoboda | |
| 5,870,607 A | 2/1999 | Netzer | |
| 5,966,541 A | 10/1999 | Agarwal | |
| 6,016,557 A | 1/2000 | Kasprzyk et al. | |
| 6,028,999 A | 2/2000 | Pazel | |
| 6,047,123 A * | 4/2000 | Brown et al. | 717/127 |
| 6,077,312 A | 6/2000 | Bates et al. | |
| 6,219,827 B1 | 4/2001 | Man | |
| 6,226,787 B1 | 5/2001 | Serra et al. | |
| 6,240,544 B1 | 5/2001 | Kaneko | |
| 6,256,777 B1 * | 7/2001 | Ackerman | 717/129 |
| 6,311,327 B1 | 10/2001 | O'Brien | |
| 6,353,924 B1 | 3/2002 | Ayers | |
| 6,513,155 B1 | 1/2003 | Alexander | |
| 6,519,766 B1 | 2/2003 | Barritz et al. | |
| 6,609,247 B1 | 8/2003 | Dua et al. | |
| 6,651,243 B1 | 11/2003 | Berry et al. | |
| 6,658,600 B1 | 12/2003 | Hogdal et al. | |
| 6,687,811 B1 | 2/2004 | Yamada | |
| 6,708,326 B1 | 3/2004 | Bhattacarya | |
| 6,721,941 B1 | 4/2004 | Morshed | |
| 6,748,584 B1 | 6/2004 | Witchel et al. | |
| 6,754,890 B1 | 6/2004 | Berry et al. | |
| 6,766,511 B1 | 7/2004 | Berry et al. | |
| 6,804,814 B1 | 10/2004 | Ayers | |
| 6,854,073 B2 | 2/2005 | Bates | |
| 6,862,694 B1 | 3/2005 | Tormey et al. | |
| 6,883,162 B2 | 4/2005 | Jackson | |
| 6,901,581 B1 | 5/2005 | Schneider | |
| 6,971,088 B1 | 11/2005 | Mimura | |
| 7,007,268 B2 * | 2/2006 | Emberson | 717/127 |
| 7,043,668 B1 * | 5/2006 | Treue et al. | 714/45 |
| 7,047,520 B2 | 5/2006 | Moore et al. | |
| 7,055,070 B1 * | 5/2006 | Uhler et al. | 714/45 |
| 7,065,749 B2 | 6/2006 | Watanabe | |
| 7,076,420 B1 | 7/2006 | Snyder et al. | |
| 7,207,035 B2 | 4/2007 | Kobrosly et al. | |
| 7,263,690 B1 | 8/2007 | Shapiro | |
| 7,266,809 B2 * | 9/2007 | Tsubata et al. | 717/129 |
| 7,299,319 B2 | 11/2007 | Dimpsey | |
| 7,318,017 B2 | 1/2008 | Swoboda | |
| 7,383,538 B2 | 6/2008 | Bates et al. | |
| 2001/0054091 A1 | 12/2001 | Lenz | |
| 2002/0035721 A1 | 3/2002 | Swoboda | |
| 2002/0166112 A1 | 11/2002 | Martin et al. | |
| 2002/0174415 A1 * | 11/2002 | Hines | 717/127 |
| 2002/0199173 A1 * | 12/2002 | Bowen | 717/129 |
| 2003/0149961 A1 | 8/2003 | Kawai et al. | |
| 2003/0154430 A1 | 8/2003 | Allen | |
| 2004/0030962 A1 | 2/2004 | Swaine et al. | |
| 2004/0073838 A1 | 4/2004 | Tabe | |
| 2004/0216013 A1 * | 10/2004 | Sun | 714/45 |
| 2004/0216091 A1 | 10/2004 | Groeschel | |
| 2005/0086650 A1 | 4/2005 | Yates | |
| 2005/0120337 A1 | 6/2005 | Serrano et al. | |
| 2005/0198466 A1 | 9/2005 | Estlick | |
| 2008/0126866 A1 | 5/2008 | Hopkinson | |
| 2009/0037703 A1 | 2/2009 | Burdick et al. | |

OTHER PUBLICATIONS

Cook, J. Reverse Execution of Java Bytecode, The Computer Journal, vol. 45, No. 6, 2002, pp. 608-619, Retrieved on [Oct. 16, 2014] Retrieved from the Internet: URL<http://comjnl.oxfordjournals.org/content/45/6/608.full.pdf+html>.*

USPTO communication to Applicants in U.S. Appl. No. 10/897,750, mailed Nov. 12, 2009. 12 Pages.

Office action in U.S. Appl. No. 10/897,750, mailed Sep. 24, 2007. 8 Pages.

Office action in U.S. Appl. No. 10/897,750, mailed Aug. 7, 2008. 11 Pages.

Office action in U.S. Appl. No. 10/897,750, mailed Apr. 29, 2009. 12 Pages.

Non-Final Rejection mailed Mar. 7, 2011 in U.S. Appl. No. 10/897,750, 7 pages.

Jooyong Lee, A Case for Dynamic Reverse-Code Generation to Debug Non-deterministic Programs [online], Nov. 2006 [retrieved on Oct. 27, 2011], pp. i-ii and 1-11. Retrieved from the internet: <URL:http://formal.korea.ac.kr/~jlee/papers/reg-case.pdf>. 13 Pages.

Mikhail Dmitriev, Safe Class and Data Evolution in Large and Long-Lived Java Applications [online], Mar. 2001 [retrieved on Oct. 27, 2011], pp. 1-212. Retrieved from the Internet><URL: http://delivery.acm.org/10.1145/980000/975002/smli_tr-2001-98.pdf>. 212 Pages.

Notice of Allowance and Interview Summary Record dated Nov. 4, 2011 re U.S. Appl. No. 10/897,749, filed Jul. 23, 2004. 27 Pages.

Notice of Allowance dated Oct. 19, 2011 re U.S. Appl. No. 10/897,750. 6 Pages.

Response to Non-Final Office Action dated Aug. 17, 2011 re U.S. Appl. No. 10/897,749. 36 Pages.

Appeal Brief dated Sep. 15, 2011 re U.S. Appl. No. 10/897,989. 46 Pages.

Notice of Allowability and Examiner Interview Summary Record mailed Apr. 29, 2011 in U.S. Appl. No. 10/898,457. 10 pages.

Non-Final Office Action mailed Feb. 17, 2011 in U.S. Appl. No. 10/897,749. 19 pages.

Examiner's Answer mailed Feb. 4, 2011 in U.S. Appl. No. 10/897,675. 33 pages.

Final Rejection mailed Dec. 15, 2010 in U.S. Appl. No. 10/897,989. 15 pages.

Office Action in U.S. Appl. No. 10/897,749, mailed May 26, 2010. 26 Pages.

Office Action in U.S. Appl. No. 10/898,457, mailed Jun. 9, 2010. 32 Pages.

Office Action in U.S. Appl. No. 10/897,675, mailed Jun. 17, 2010. 46 Pages.

Office Advisory Action U.S. Appl. No. 10/897,749, mailed Sep. 3, 2010. 5 Pages.

Office Advisory Action U.S. Appl. No. 10/897,675, mailed Sep. 9, 2010. 4 Pages.

USPTO communication to Applicants in U.S. Appl. No. 10/897,752, mailed Sep. 9, 2009. 112 Pages.

Booth, Simon P. et al., Walk Backwards to Happiness—Debugging by Time Travel, Tech. Report CSM-143, Department of Computing Science and Mathematics, University of Stirling, Scotland, UK, Jul. 1997. 14 Pages.

Akgul et al., "Assembly Instruction Level Reverse Execution for Debugging," ACM Transactions on Software Engineering and Methodology (TOSEM), vol. 3, No. 2, Apr. 2004, pp. 149-198. 50 Pages.

Harkema et al., "Performance Monitoring of Java Applications," Workshop on Software and Performance, Proceedings of the 3rd international workshop on Software and performance, Rome, Italy, Jul. 2002, pp. 114-127. 14 Pages.

Meszaros et al., "Agile Regression Testing Using Record and Playback," Conference on Object Oriented 4 Programming Systems Languages and Applications, Companion of the 18th annual ACM SIGPLAN conference on Object-oriented programming, systems, languages, and applications, vol. 3, No. 2, 2003, pp. 353-360. 8 Pages.

Luo, Y. Locality-based Online Trace Compression, IEEE Transactions on Computers, Jun. 2004, pp. 732-731 Retrieved on [Jun. 6, 2012] Retrieved from the Internet: URL<http://ieeexplore.ieee.org/stamp/stamp.jsp?tp=&arnumber=1288547> 9 Pages.

Sandon, P. A. NStrace: A bus-driven Instruction Trace Tool for PowerPC Microprocessors, IBM Journal of Research and Development, May 1997, pp. 331-344, Retrieved on [Jun. 6, 2012] Retrieved from the Internet: URL<http:// ieeexplore.ieee.org/stamp/stamp.jsp?tp=&arnu rnber=5389391 > 14 Pages.

(56) References Cited

OTHER PUBLICATIONS

USPTO communication to Applicants in U.S. Appl. No. 10/898,457, mailed Oct. 27, 2009. 43 Pages.
USPTO communication to Applicants in U.S. Appl. No. 10/897,749, mailed Sep. 11, 2009. 38 Pages.
USPTO communication to Applicants in U.S. Appl. No. 10/897,675, mailed Sep. 22, 2009. 44 Pages.
USPTO communication to Applicants in U.S. Appl. No. 10/897,989, mailed Apr. 2, 2010. 17 Pages.
Borland International. Inc .. Turbo Debugger for Windows, Version 3.0, User's Guide, Scotts Valley, Calif., 1988, 1991. 297 Pages.
Rosenberg, Jonathan B., How Debuggers Work: Algorithms, Data Structures, and Architecture, John Wiley & Sons, Inc., New York, 1996. 266 Pages.
Trace 32 News: Fire, Ice and ICD: Three No. 1 Hits!, Article, Spring 1999, Lauterbach Datentechnik GmbH, Hofolding, Gennany. http://www.lauterbach.com. 6 Pages.
Trace 32 Smart Trace, Article, Jun. 3, 2002, Lauterbach Datentechnik GmbH, Copyright © 2005, Hofolding, Germany. 4 Pages.
Trace 32 Already Supports Nexus Standard, Article, 2001, Lauterbach Datentechnik GmbH, Hofolding, Germany. 14 pages.
10,000 TRACE32-ICD Debuggers Supplied, Article, 2002, Lauterbach Datentechnik GmbH, Hofolding, Germany. 17 pages.
Trace 32 In-Circuit Debugger (without ROM Monitor) Quick Installation and Tutorial, Instruction Manual, Jan. 1999, Lauterbach Datentechnik GmbH, Copyright © 1989-1998, Hofolding, Germany. 48 Pages.
TRACE32 Online Manual, Online User Manual, Copyright© 1988-2003, Lauterbach Datentechnik GmbH, Hofolding, Germany. 7,682 Pages.
TRACE32 Context Tracking System, Online Article, May 12, 2004, Lauterbach Datentechnik GmbH, Hofolding, Germany Copyright @ 2005. 5 Pages.
Trace for ARM-ETM (Tutorial), Tutorial, Copyright@ 1988-2003, Lauterbach Datentechnik GmbH, Hofolding, Germany. 24 Pages.
Notice of Allowance dated Oct. 11, 2011 re U.S. Appl. No. 10/897,750. 7 Pages.
Office action in U.S. Appl. No. 10/897,749, mailed Apr. 1, 2008. 18 Pages.
Office action in U.S. Appl. No. 10/897,749, mailed Dec. 23, 2008. 26 Pages.
Office action in U.S. Appl. No. 10/897,752, mailed Mar. 17, 2008. 19 Pages.
Office action in U.S. Appl. No. 10/897,752, mailed Dec. 15, 2008. 15 Pages.
Office action in U.S. Appl. No. 10/897,675, mailed Aug. 9, 2007. 19 Pages.
Petition decision in U.S. Appl. No. 10/897,675, mailed Jul. 21, 2008. 7 Pages.
Office action in U.S. Appl. No. 10/897,675, mailed Jan. 7, 2009. 23 Pages.
Office action in U.S. Appl. No. 10/897,989, mailed Dec. 28, 2007. 19 Pages.
Office action in U.S. Appl. No. 10/897,989, mailed Oct. 28, 2008. 20 Pages.
Office action in U.S. Appl. No. 10/897,989, mailed Jul. 7, 2009. 14 Pages.
Office action in U.S. Appl. No. 10/898,457, mailed Apr. 22, 2008. 17 Pages.
Office action in U.S. Appl. No. 10/898,457, mailed Feb. 4, 2009. 35 Pages.
Office Action in U.S. Appl. No. 10/897,750, mailed Jul. 28, 2010. 14 Pages.
Patent Board Decision dated Feb. 20, 2014 re U.S. Appl. No. 10/897,675, filed Jul. 23, 2004. 12 Pages.

* cited by examiner

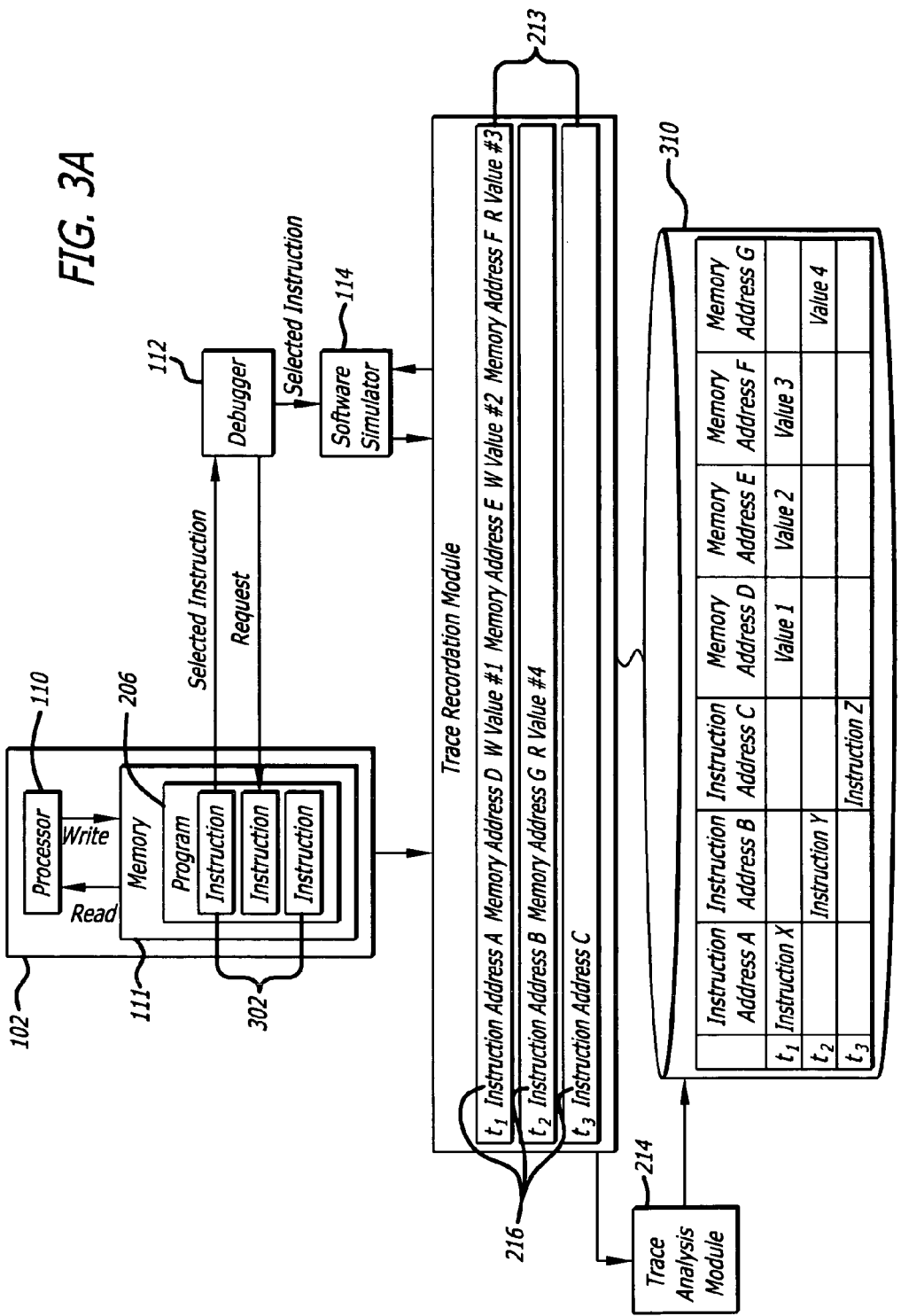

FORWARD POST-EXECUTION SOFTWARE DEBUGGER

RELATED APPLICATIONS

The present application is a continuation of U.S. patent application Ser. No. 10/897,757, filed on Jul. 23, 2004, entitled "FORWARD POST-EXECUTION SOFTWARE DEBUGGER," which is related to U.S. patent application Ser. No. 10/897,749, filed Jul. 23, 2004, entitled BACKWARD POST-EXECUTION SOFTWARE DEBUGGER, now U.S. Pat. No. 8,136,096; U.S. patent application Ser. No. 10/897,675, filed Jul. 23, 2004, entitled POST-EXECUTION SOFTWARE DEBUGGER WITH ACCESS BREAKPOINTS; U.S. patent application Ser. No. 10/897,750, filed Jul. 23, 2004, entitled POST-EXECUTION SOFTWARE DEBUGGER WITH EVENT DISPLAY, now U.S. Pat. No. 8,132,159; U.S. patent application Ser. No. 10/897,752, filed Jul. 23, 2004, entitled POST-EXECUTION SOFTWARE DEBUGGER WITH PERFORMANCE DISPLAY, now U.S. Pat. No. 7,653,899; U.S. patent application Ser. No. 10/898,457, filed Jul. 23, 2004, entitled POST-EXECUTION SOFTWARE DEBUGGER WITH COVERAGE DISPLAY, now U.S. Pat. No. 8,015,552; and U.S. patent application Ser. No. 10/897,989, filed Jul. 23, 2004, entitled SYSTEM AND METHOD FOR FORWARD AND BACKWARD DEBUGGING USING A TRACE LOG all of which were filed concurrently therewith by Michael Lindahl, Andre Yew, Morgan Green, Michael Johnson, Craig Franklin, Daniel O'Dowd, and Neil Puthoff. Each of the foregoing patents and patent applications is hereby incorporated by reference in its entirety.

BACKGROUND OF THE DISCLOSURE

1. Field of the Disclosure

The disclosure generally relates to computer programs executed on computing devices, and more particularly to debuggers for detecting errors in the computer programs.

2. General Background

Software debuggers have assisted many computer programmers in finding errors in their computer programs. These errors are generally referred to as "bugs". The most common bug is a computer program not doing what it is supposed to do. Finding bugs can often be a cumbersome task for a computer programmer.

One of the difficulties is that a bug may manifest itself long after the computer instruction that caused it was executed. For instance, a first computer instruction may perform a calculation to output a result that is not used by a second computer instruction until millions of instructions after the first instruction was performed.

If the bug is a "reproducible bug", a computer programmer can usually use a debugger to quickly determine the immediate cause of the bug. One of ordinary skill in the art will recognize the term "reproducible bug" to mean a bug that manifests itself in the same way every time a program is executed with the same input.

A debugger can be used to help determine the cause. However, traditional debuggers have limited capabilities. Using a traditional debugger often takes a programmer days or weeks to find bugs that take a long time to reproduce or that are not reproducible.

SUMMARY

A method and system debug a computer program by using trace data, which is a recording of the sequence of machine instructions executed by a program during a time period along with the addresses and values of memory locations accessed and modified by each machine instruction. After the time period, the method and system use the trace data to simulate the execution of the program during the time period under the control of a debugger. In addition, the method and system use the trace data to simulate the execution of the program during the time period backwards in time under the control of the debugger. In addition, the method and system use the trace data to display information about operating system events that occurred during the time period. In addition, the method and system use the trace data to display performance and code coverage data about machine instructions, source lines, functions, and tasks during the execution of the program in the time period.

In one aspect, there is a method of finding an error in a computer program. Trace data is recorded from an execution of the computer program for a time period. A plurality of execution breakpoints are set in the computer program. Accordingly, a portion of the execution of the computer program as recorded in the trace data is simulated until one a plurality of conditions is met. One of the plurality of conditions is an attempt to execute a machine instruction associated with one of the plurality of execution breakpoints.

In another aspect, there is a method of finding an error in a computer program. A sequence of machine instructions performed by a processor as trace data are recorded. Further, a plurality of breakpoints is set, each of the plurality of breakpoints being associated with a source code instruction. The plurality of breakpoints is translated into a plurality of translated machine instructions. A forward execution is simulated of at least a portion of the sequence of machine instructions until one of a plurality of conditions is met. One of the plurality of conditions is an attempt to simulate execution of one of the translated machine instructions.

In one aspect, another one of the plurality of conditions is the simulation of the execution of the last machine code instruction. In another aspect, another one of the plurality of conditions is a user specified condition. In yet another aspect, another one of the plurality of conditions is a time limit.

In another aspect, there is a method of finding an error in a computer program. A sequence of instruction addresses and memory addresses at a plurality of execution times as trace data are recorded. A database is composed that represents the state of a memory at each of at least a subset of the plurality of execution times. A plurality of breakpoints is set, each of the plurality of breakpoints being associated with a source code instruction. The plurality of breakpoints is translated into a plurality of translated machine instructions. A forward execution is simulated of at least a portion of the sequence of machine instructions by changing a plurality of simulated memory values according to the state of the memory in the database until an attempt is made to simulate execution of one of the translated machine instructions or until the execution of the last machine code instruction in the portion of the sequence of machine instructions has been simulated.

BRIEF DESCRIPTION OF THE DRAWINGS

By way of example, reference will now be made to the accompanying drawings.

FIG. 3A illustrates an internal schematic diagram of the block diagram illustrated in FIG. 1.

DETAILED DESCRIPTION

A method and a system are disclosed for improving software debugging capabilities. For instance, in one embodiment, a software debugger's capabilities are enhanced to better handle reproducible bugs that require a long time to reproduce. In another embodiment, a software debugger's capabilities are enhanced to better deal with irreproducible bugs and bugs that take a long time to reproduce. An irreproducible bug is a bug that produces different behavior each time the program is executed. Irreproducible bugs are the most time-consuming and challenging bugs to find. With the method and system as described below, irreproducible bugs often can be found much more quickly helping to eliminate random bugs, glitches, and crashes that plague many complex programs.

In yet another embodiment, the method and system help discover bugs that will not manifest themselves when the software debugger is connected. For instance, some bugs only manifest themselves when the program runs at full speed. When a debugger is utilized, the program may run at a much slower speed than normal execution speed. Accordingly, in one embodiment, the method and system described below provide the ability to more easily discover this type of bug.

The ability to discover a particular type of bug is not limited to a particular embodiment. Rather, one embodiment may be helpful in finding one or more of the different types of bugs discussed.

Figure 1:
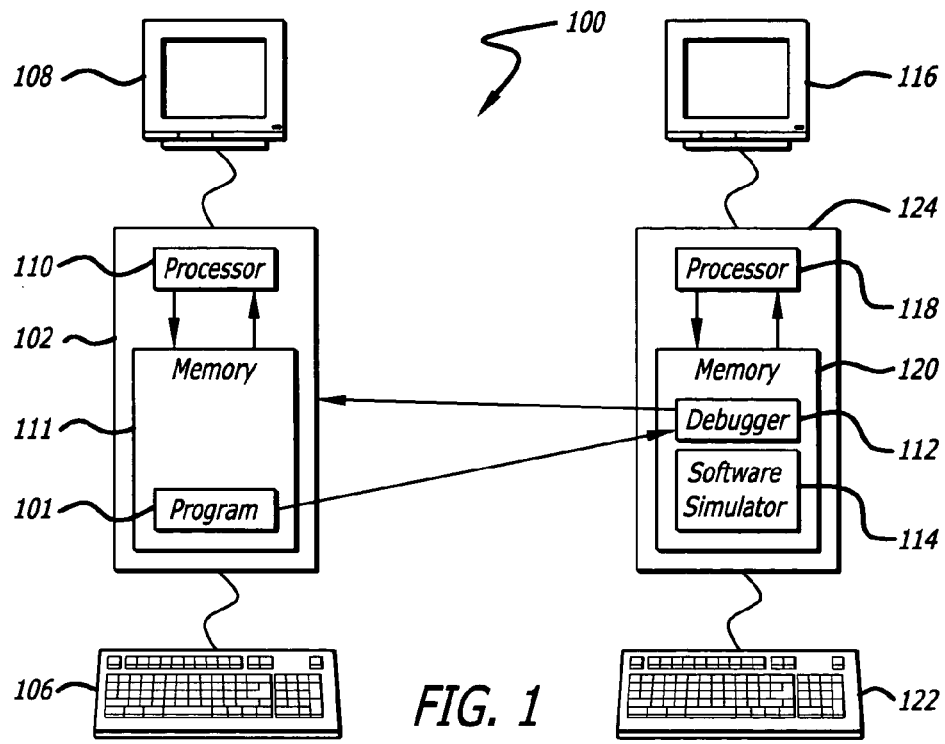
FIG. 1 illustrates a block diagram of one embodiment in which a computer interacts with a debugger and a software simulator.

FIG. 1 illustrates a block diagram of one embodiment of a post-execution debugging environment 100 that allows a computer programmer to debug a computer program 101. A target computer 102 stores the computer program 101 in a memory 111. The target computer 102 also has a processor 110 that can read and/or write to the memory 111. In one embodiment, the target computer 102 is operably attached to an input device 106. In another embodiment, the target computer 102 communicates with the input device 106 through a sensor without being attached to the input device 106. In another embodiment, the target computer 102 is operably attached to an output device 108. In another embodiment, the target computer 102 communicates with the output device 108 through a sensor without being attached to the input device 106. The target computer 102 is essentially the computer on which a user would normally run the computer program 101.

The post-execution debugging environment 100 also includes a host computer 124 that includes a debugger 112 for debugging the computer program 101. The debugger 112 is stored in a memory 120. A software simulator 114 is also stored in the memory 120. The host computer 124 also has a processor 118 that reads and/or writes to the memory 120. In one embodiment, the host computer 124 has an output device 116. In another embodiment, the host computer 124 has an input device 122.

In order to perform a particular function, the computer 102 will run the program 101 which is a collection of machine instructions and data. The program 101 is stored in a plurality of memory locations in the memory 111.

Most programs are written by programmers in a high level programming language. One of ordinary skill in the art will recognize that a high level programming language is either a software programming language, such as C, C++, Ada 95, Java, or a hardware description language, which describes the operation of a hardware device, such as Verilog or VHDL. The program as written by the programmer is called source code. The source code includes lines of text called source lines.

A compiler is a software program that can be stored on the computer 102 that is used to translate source code written in a high level programming language into the machine instructions stored in the memory 111 to be executed by the processor 110. The programmer is usually not even conscious of the existence of these low level machine instructions. The programmer prefers to think of the program in terms of the high level source lines in which the software program is written. The hardware description language can be compiled into either a hardware design or into instructions that can run on a hardware description language simulator. In one embodiment, the compiler is stored on the computer 124. In another embodiment, the compiler is stored on a third computer distinct from the computer 102 and the computer 124.

The processor 110 accesses the memory 111 to execute the machine instructions of the program 101, which are stored in the memory 111. In one embodiment, the processor 110 executes each of the machine instructions one at a time at a rate of many millions of instructions per second. In one embodiment, the processor 110 has one or more registers, which are high speed memory locations physically located in the processor 110. One of ordinary skill in the art will recognize that the processor 110 can access data in a memory location in the memory 111, data in a register, or data in both. Further, one of ordinary skill in the art will recognize that the processor 110 can either read data from the memory 111 and/or write data to the memory 111.

In one embodiment, the processor 110 and the memory 111 are housed inside of a housing. In another embodiment, the computer 102 is meant to cover any device that has the processor 110 embedded within it. For instance, a household appliance that has an embedded processor would be deemed to have the computer 102. In addition, an automobile, jet airplane, space shuttle, helicopter, train, or any other transportation vehicle with an embedded processor would be deemed to have the computer 102. Further, any communications device, such as a cellular telephone, is deemed to be the computer 102. In addition, a personal digital assistant would be deemed to be the computer 102. One of ordinary skill in the art will recognize that the computer 102 is meant to cover future devices that are operably connected to the processor 110. The term "computer" is generally meant to cover any device with the processor 110. The memory 111 can be internal, external, or even at a remote location. The input device 106 and the output device 108 are not necessary for the computer 102.

In one embodiment, the processor 110 is a physical chip. In another embodiment, the target computer 102 is a software program that emulates a physical computer. In essence, the processor 110 in this embodiment is part of the program 101.

The computer 102 receives one or more external inputs from the input device 106. The external inputs can be instructions and/or data to be processed by the processor 110. In one embodiment, the input device 106 receives one or more external inputs from a human operator. In another embodiment, the input device 106 receives one or more external inputs from another computer. In yet another embodiment, the input device 106 is not needed because a set of pre-inputted data is stored on the computer 102 and can be used in an automated fashion, such as according to a clock.

The input device 106 can include a variety of hardware configurations. In one embodiment, the input device 106 is a keyboard. In another embodiment, the input device 106 is a touch screen. In another embodiment, the input device 106 is a computer mouse. In yet another embodiment, the input device 106 is a microphone that receives a voice command, which is provided to a voice recognition software module. In one embodiment, the input device 106 is a communications device, such as a modem, which receives data from another computer.

The computer 102 is also able to send data from inside the computer 102 to outside the computer 102 through the output device 108. The data that is outputted by the output device 108 can be a result of the execution of the processor 110. In one embodiment, the output device 108 is a display. For example, a screen such as a liquid crystal display ("LCD"), or a plasma display, can be the output device 108. In another embodiment, the output device 108 is a printer. In yet another embodiment, the output device 108 is an audio speaker, which outputs data through an audio signal. In another embodiment, the output device 108 is a modem that outputs data to another computer through a communications link.

Any of the different embodiments or variations discussed above with respect to the computer 102 are also applicable to the computer 124. Further, any of the different embodiments or variations discussed above with respect to the input device 106 is also applicable to the input device 122. Finally, any of the different embodiments or variations discussed above with respect to the output device 108 is also applicable to output device 116.

The debugger 112 is a program that helps a programmer find a bug in the target program 101. In one embodiment, the debugger 112 allows a programmer to interactively find bugs in the program 101 by controlling the program's 101 operation. In one embodiment, the debugger 112 is stored on the host computer 124 in the memory 120. Usually the debugging environment is displayed on the output device 116. In some instances, the programmer debugs by modifying the state of the program. One of ordinary skill in the art will recognize that the state of a program is a set of values stored in the memory locations of the memory 111 at a time period in the execution of the program. In one embodiment, the program 101 that is controlled by the debugger 112 is stored on the computer 102. The computer 124 communicates with the computer 102 to allow the debugger 112 to control the program 101. In one embodiment, the host computer 124 is operably attached to the target computer 102. For example, the host computer 124 is operably attached to the target computer 102 through a serial connection, an Ethernet connection, or a USB connection. In another embodiment, the computer 124 communicates with the computer 102 through a network connection. In yet another embodiment, the computer 124 communicates with the computer 102 through a wireless connection. In one embodiment, the computer 124 communicates with the computer 102 through a signal, such as an infrared signal.

The debugger 112 has the capability to control, examine, and/or modify the target program 101, the processor 110, the memory 111, and in general the target computer 102. The debugger 112 controls the target program 101 by providing one or more commands to the target program 101.

In one embodiment, a user enters debugging commands on the host computer 124 to debug the program 101 on the target computer 102. The user can input the commands through the input device 122 as illustrated in FIG. 1. The user can input the commands by inputting characters, clicking icons, clicking buttons, making movements of a computer mouse, providing voice commands, or any other form of input recognized by one of ordinary skill in the art. The debugger 112 includes control commands, display commands, and modification commands for debugging the target program 101. One example of the debugger 112 is the MULTI integrated development environment from Green Hills Software, Inc. However, the debugger 112 is not limited to that particular product.

The control commands of the debugger 112 include a start command to start execution of the target program 101 and a stop command to stop execution of the target program 101. The debugger 112 allows the user to place an execution breakpoint on a machine instruction or a source line of the target program 101. Whenever the program attempts to execute a machine instruction or a source line that corresponds to an execution breakpoint, the debugger 112 will provide a stop command to the program. In other words, the debugger 112 stores instructions associated with breakpoints and checks each instruction prior to execution to see if the instruction is associated with an execution breakpoint. To get into the vicinity of a bug, a programmer may place breakpoints in the vicinity of locations where the programmer suspects the bug to be. When the program stops at one of the breakpoints, the programmer can display the state of the program 101 to determine if the bug has occurred or is about to occur. If the cause of the bug is not yet obvious, the programmer can input a start command to the debugger 112, which then issues a start command to the program to continue until the next breakpoint. Alternatively, the programmer can set more breakpoints before continuing execution.

In another embodiment, the debugger 112 does not need to store the instructions associated with the breakpoints. After the user sets the breakpoints, the debugger 112 searches through the compiled machine code and places a marker at each of the instructions associated with breakpoints to indicate that the execution should be halted if an attempt is made to execute that particular instruction. A variety of different configurations can be used for implementing breakpoints.

A computer programmer can often expedite the debugging process by utilizing breakpoints. For instance, breakpoints can be helpful to the computer programmer trying to debug a reproducible bug. The computer programmer can use a binary searching methodology to determine the original cause of the reproducible bug. The computer programmer initially determines the immediate cause of the error. Subsequently, the computer programmer attempts to surround the immediate cause of the error with a before-breakpoint and an after-breakpoint. The before-breakpoint is placed at a location at which the computer programmer is sure stops the program before the immediate cause of the error occurs. The after-breakpoint is placed at a location at which the programmer is sure stops the program after the immediate cause of the error occurs. The program is restarted and run to the before-breakpoint. The programmer then sets a new middle-breakpoint about halfway between the before and after-breakpoints. The program is then run to the middle-breakpoint. If the error has manifested itself, the error is between the before-breakpoint and the middle-breakpoint. The process is repeated with the middle-breakpoint as the after-breakpoint. On the other hand, if the error has not manifested itself middle-breakpoint as the before-breakpoint. In either case, the immediate cause of the bug has now been isolated to an interval that is only about half the length of the previous interval. This process may be repeated until the interval is reduced to just one source line.

Once the source code responsible for the incorrect behavior has been identified, the bug may or may not be obvious. Sometimes the identified source code is not at fault. Rather the incorrect behavior may be a result of incorrect data. The programmer then needs to track down the source code that last modified the data. The use of read access breakpoints, write access breakpoints, and conditional breakpoints can help a programmer track down source code that has affected incorrect data.

A read access breakpoint is a breakpoint that is associated with one or more memory locations rather than an instruction. The read access breakpoint will stop the program 101 whenever the program 101 attempts to access one of the memory locations associated with the read access breakpoint.

A write access breakpoint is a breakpoint that is also associated with one or more memory locations rather than an actual instruction. The write access breakpoint will stop the program whenever the programmer attempts to change one of the memory locations associated with the write access breakpoint. After the programmer determines that a bug is caused by data corruption rather than an incorrect instruction, the programmer can set a write access breakpoint associated with the corrupted memory. The programmer restarts the program with the breakpoint enabled. Each time the memory is changed, the program stops and the programmer can determine if the location at which the program stops is the location in the source code that corrupted the data.

A programmer often suspects that a bug is in a certain part of the source code, but the bug only manifests itself after executing machine code associated with that source code hundreds or thousands of times. Putting a breakpoint in the source code in this instance is impractical because it would require hundreds or thousands of commands to reach the location causing the error. A conditional breakpoint helps alleviate this problem. The conditional breakpoint is a breakpoint that associates a mathematical formula or a small amount of source code with a breakpoint. When the program reaches the conditional breakpoint, the debugger evaluates the mathematical formula or the source code to see if a certain value is produced. If the condition is not true, the debugger 112 automatically continues executing the program without programmer intervention.

The debugger 112 also has display commands to display the state of the target program 101. The programmer can provide a display command to the debugger 112 to view the contents of a particular memory location at a particular point in the execution of the program. For instance, the programmer can view a variable stored in the memory 111 when the execution of the program 101 is stopped at a breakpoint.

The software simulator 114 is a program that simulates the operation of the execution of the program, which is stored on the computer 124 in the memory 120, by the processor 110. In one embodiment, the software simulator 114 simulates the execution of the program at a different speed than that which was performed by the processor 110. The software simulator 114 can communicate with the target computer 102 in any of the different embodiments or variations discussed with respect to the communication between the debugger 112 and the target computer 102.

Figure 2:
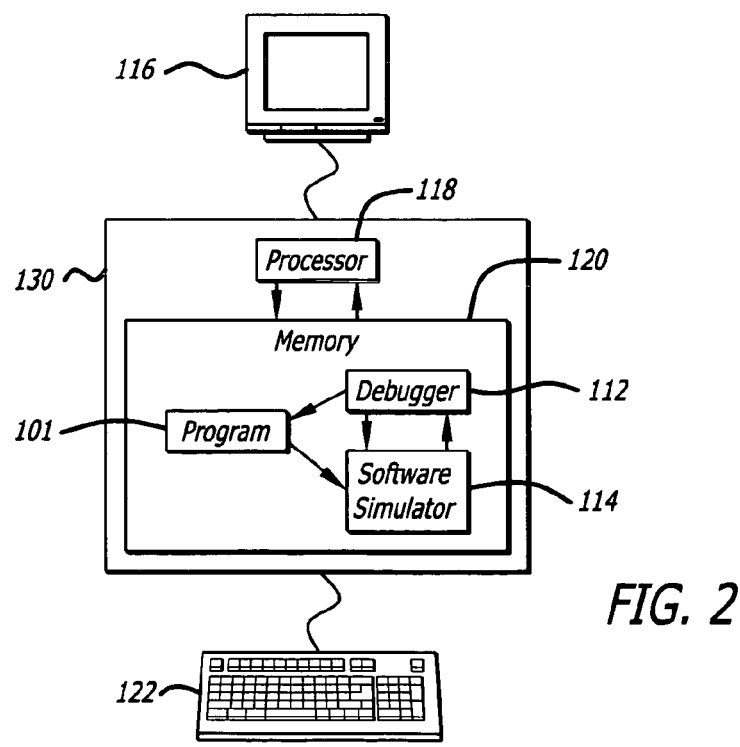
FIG. 2 illustrates an embodiment in which the debugger is stored on the same computer as the program.

FIG. 2 illustrates an embodiment in which the debugger 112 is stored on the same computer 130 as the program 101. In one embodiment, the memory 120 stores the debugger 112, the software simulator 114, and the program 101. The computer 130 is essentially both a host computer and a target computer. An input device 122 and/or an output device 116 can be operably attached to the computer 130 according to the different embodiments and variations as discussed above with respect to the target computer 102 and the host computer 124. In one embodiment, a copy of the program 101 stored on the target computer 102 is made and placed on the host computer 124.

In one embodiment, the software simulator 114 simulates a theoretical computer system, such as a Java Virtual Machine. In another embodiment, the software simulator 114 is a hardware description language simulator, such as Verilog and VHDL.

FIG. 3A illustrates an internal schematic diagram of the block diagram illustrated in FIG. 1. In one embodiment, the computer 102 has the processor 110 interacting with the memory 111 to execute the program 101. The processor 110 reads and writes to memory locations in the memory 111. The program 101 includes a plurality of instructions 302. The debugger 112 controls execution of the program 101 to find an error in the program 101.

In one embodiment, the computer 102 is configured to output a detailed record of changes to the processor 110 and the memory 111 as the changes occur. This detailed record is known as trace data. When the computer 102 is halted because of an error, the state of the processor 110 and the memory 111 can be recorded in the trace data for analysis at a later time. In one embodiment, the trace data includes an ordered sequence of machine instructions performed by the processor 110 during the execution of the program 101. The trace data is helpful to the programmer because it is often not obvious from the source code alone the order in which the processor 110 actually performed machine instructions translated from the source lines by the compiler or the number of times that an individual machine instruction was performed. For instance, the source code may have source lines at the very beginning indicating that a variable should be modified if a condition is met. Although these instructions appear at the beginning of the source code, the instructions will not appear at all in the trace data if the condition is never met.

As another example, the source code may have source lines for printing a value of a variable within the body of a loop. In this example, the source lines for printing the value of the variable appear only once in the source code. On the other hand, the trace data provides a listing of the actual number of times that the print execution was executed by the processor 110 as a result of the loop.

In another example, the source code has source lines that define a function at the beginning of the source code. The source code also has source lines at the end of the source code that make a function call to the function. Therefore, the source code lists the function well before the function call. However, the processor 110 actually executes machine instructions for the function call before machine instructions for the function and executes both sets of machine instructions in fairly close proximity to one another. The trace data reflects the actual sequence of machine instructions that were performed by the processor 110.

The machine instructions are stored in the memory 111. The processor 110 then accesses the memory 111 to retrieve the machine instructions and perform a read and/or write instruction to a memory location in the memory 111. In one embodiment, the trace data includes a listing of memory addresses. The memory address can either store a machine instruction or a value or a variable that was accessed or modified by the machine instruction.

In one embodiment, a trace recordation module 212 records the trace data outputted from the processor 110. The trace recordation module 212 stores at least a portion of the trace data in a trace data listing 213. The trace data listing 213 lists a plurality of memory instructions 216 storing machine instructions that were executed by the processor 110 in the order in which they were executed. The instruction addresses are memory addresses that store the machine instructions. The machine instructions may be executed more than once and will therefore appear more than once in the trace data listing 213. Further, the trace data listing 213 lists the time that each of the machine instructions in the plurality of memory addresses 216 was executed by the processor 110. In one embodiment, the trace data listing 213 also lists a plurality of memory addresses which each of the machine instructions accesses. Further, there is an indication in the trace data listing 213 that a read took place. For instance, a symbol such as an "R" can be used to indicate a read. In another embodiment, the trace data listing 213 also lists a plurality of memory addresses which each of the machine instructions writes to. For instance, a symbol such as a "W" can be used to indicate a write.

In one embodiment, the trace recordation module 212 provides the trace data listing 213 to a trace analysis module 214 which composes a database 310 from the trace data listing 213. In one embodiment, a single module can perform the functions of both the trace recordation module 212 and the trace analysis module 214. The database 310 stores the values of the memory locations in the memory 111 that were read or written to at each time that the processor 110 executed an instruction in the trace data. When initially composing the database 310, the trace analysis module 214 leaves the memory locations that were not read or written to as unknown values. The trace analysis module 214 can fill in these unknown values into the database 310 so that the database 310 stores the values of each memory location in the memory 111 at a given time period.

A few different methodologies can be used for filling in the unknown values in the database 310. In one embodiment, the trace analysis module 214 reviews the database 310 to determine when read instructions were processed. A read instruction at a given time will give the value stored in a memory location of the memory 111 at a given time. The trace analysis module 214 can then review the memory location at a time period after the read in the database 310 to determine if the memory location has an unknown value. If the memory location has an unknown value and there were no writes after the read, the trace analysis module 214 stores the value resulting from the read at the memory location with the unknown value. The stored value now likely represents the actual value of the memory location at the given time because there were not any modifications to the memory location a time subsequent to the read instruction.

In yet another embodiment, the trace analysis module 214 searches through the trace data listing 213 to determine if the memory location that has an unknown value was written at a time previous to the unknown value. If the memory location was written to at an earlier point, the unknown value of the memory location is replaced with the previously written value.

In another embodiment, the trace analysis module 214 stores the values of all of the memory locations in the memory 111 at the time that the processor 110 halts. By having all of the values of the memory locations in the memory 111, the trace recordation module 212 can search through the database 310 to determine if there are any unknown values. If there were any unknown values, the trace module would fill in the final state value of the memory location as this value likely did not change prior to the final state if there were not any writes to the memory location. In yet another embodiment, the values of the registers located on the processor 110 can also be composed for each given time in the database 310 by analyzing the trace data listing 213.

In one embodiment, the database 310 is composed from at least a portion of the trace data listing 213. The trace data listing 213 could potentially have billions of instructions. Building the database 310 on such a large amount of data could potentially involve a very large amount of memory and a great deal of time. If a smaller portion of the trace data 213 is used within the vicinity of the location at which the programmer surmises to be the immediate cause of the error, the programmer can compose the database 310 much more quickly with fewer resources. For example, the programmer can select twenty-five thousand instructions within one billion instructions in the trace data listing 213 as opposed to one billion instructions. If the twenty-five thousand instructions prove to be insufficient for finding the error, the programmer can set the portion of the trace data listing 213 to be larger, such as one hundred thousand instructions. In one embodiment, the database 310 is stored in the memory 120 in the host computer 124. In yet another embodiment, the database 310 is stored in the memory 111 in the target computer 102. In another embodiment, the database 310 is stored on a computer readable medium that stores data, such as a diskette, computer memory, hard drive, USB jump drive, or another data storage device. The computer readable medium can be external to the host computer 124 or the target computer 102.

In one embodiment, the database 310 is not needed. The trace data listing 213 is simply annotated with the memory values from previous or subsequent instructions, In addition, a simulation instruction can be annotated to each instruction in the trace data listing 213 to indicate how to move backwards from one instruction to a previous instruction.

In one embodiment, the trace recordation module 212 is a hardware device operably connected to the processor 110. In another embodiment, the trace module is part of the processor 110. In yet another embodiment, the trace module is a software program that the processor 110 executes to record the trace data.

In one embodiment, the trace recordation module 212 is an external hardware device that is outside of the computer 102 such as a logic analyzer, in-circuit emulator, or a trace probe. The trace recordation module 212 monitors the execution of the processor 110 without the need to intervene in the operation of the processor 110.

In yet another embodiment, there is no need for the trace recordation module 212. The processor 110 outputs the trace data. In one embodiment, the processor 110 outputs the trace data directly to the software simulator 114. In another embodiment, the processor 110 outputs the trace data directly to the debugger 112. The debugger 112 can then output the trace data to the software simulator 114 if a simulation of instructions in the trace data is to be performed. In yet another embodiment, the processor 110 outputs the trace data to the output device 108, which can then output the trace data to the debugger 112, the software simulator 114, or another computer.

In one embodiment, there is no need for the trace module 112 because the software simulator 114 records trace data during the simulation of an execution of a program. The trace data recorded from the simulation can then be analyzed.

In one embodiment, the processor 110 transmits the plurality of memory addresses 216 storing the machine instructions in the order of execution to the trace recordation module 212. In one embodiment, the plurality of memory addresses instructions 216 stored in the trace recordation module 212 is a set of memory addresses for machine instructions in the order actually performed by the processor 110 during the execution of the program. Each of the machine instructions in the plurality of memory addresses 216 is translated from a source code instruction in the program 101. The translation from source code to machine code can be accomplished through a compiler. In one embodiment, the compiler outputs a file with the translation results. The debugger 112 can access this file to determine what source code instruction is associated with each machine code instruction. In one embodiment, the debugger 112 includes the compiler.

The software simulator 114 essentially recreates the state of the processor 110 and the memory 111 for a set of different time periods as recorded by the trace data. The software simulator 114 can use the trace data to simulate the execution of the next instruction of the program by applying the changes that the actual execution of the next machine instruction recorded in the trace data and the software simulator's 114 knowledge of the effects of the instruction. In one embodiment, the simulator 114 accesses the database 310 to recreate a state for a given time period. For instance, if the simulator 114 is attempting to execute a simulation from the beginning of the trace data listing 213, the simulator 114 would access the database 310 to determine the values of the memory locations in the memory 111 at time $t_1$ as illustrated in the database 310. The simulator 114 would then set corresponding simulated memory locations to these values.

In one embodiment, the debugger 112 controls the simulator 114. The simulator 114 represents the approximate state of the program 101 at some time $t_1$ that is represented in the trace data listing 213. If the debugger 112 provides a run command to execute the machine instruction at time $t_1$, the simulator 114 sets the corresponding simulated memory location to the values stored in the database 310 at time $t_1$. When the debugger 112 provides a run command to the simulator 114, the simulator 114 will begin simulating execution of the machine instructions from the state at that point. Therefore, the simulator 114 initially represents the state of the program 101 at some time and simulates the execution of the next instruction by representing the state of the program at the time of the next instruction.

For example, the simulator 114 can represent the state of the program 101 at the time $t_1$ and can simulate the execution of the next instruction at time $t_2$ by representing the state of the program 101 at $t_2$. Accordingly, the simulator 114 sets the corresponding simulated memory locations to the values stored in the database 310 at time $t_2$. In effect, the simulator 114 is simulating the change to the state of the system that the machine instruction at time $t_2$ caused. In one embodiment, the simulator 114 modifies the simulated memory locations at time $t_1$ so that the simulated memory locations at time $t_2$ reflect the memory values stored at time $t_2$ in the database 310. The simulator 114 can represent the state at each subsequent machine instruction and stop when a breakpoint or the end of the trace data listing 213 is reached.

If the debugger 112 provides a run backwards command to the simulator 114, the simulator 114 represents the state of the program 101 at a previous time. For instance, if the simulator 114 is currently representing the state of the program 101 at time $t_{100}$ and the debugger 112 provides a run backwards command, the simulator 114 will represent the state of the program 101 at the time for time $t_{99}$ for the previous instruction. Accordingly, the simulator 114 sets the corresponding simulated memory locations to the values stored in the database 310 at time $t_{99}$. In essence, the software simulator 114 can undo the effects of the execution of the last instruction of the program 101 executed by undoing the changes that the actual execution of that machine instruction recorded in the trace data.

In one embodiment, the debugger 112 will display data in response to display commands when the simulation is halted. The debugger 112 will display the data in response to display commands after a forward simulation or after a backwards simulation.

In one embodiment, both the software program 101 and the software simulator 114 are controlled by the debugger 112. The debugger 112 provides a familiar interface to analyze the plurality of instructions 208 of source code in the program 101. The programmer can place a plurality of breakpoints in the source code of the program 101 just as if the programmer was using breakpoints in a traditional debugger. Once the programmer selects an instruction for a breakpoint, the debugger 112 can determine what machine instruction correlating to the source code instruction would have been executed by the processor 110 at the breakpoint. The debugger 112 makes this determination by reviewing a translation table to see how the compiler translated the source code instruction into a machine instruction. In one embodiment, the translation table is produced at the time that the compiler compiled the source code into machine instructions. The debugger 112 can then access the translation table in a file.

The debugger 112 then provides the memory addresses of the machine instructions at which breakpoints are to be placed to the software simulator 114. In one embodiment, the simulator 114 searches through the plurality of memory addresses 216 storing machine instructions in the trace data listing 213 to find the selected memory addresses. In one embodiment, the debugger 112 searches through the memory addresses received in the plurality of memory addresses 216 storing machine instructions. Once the selected memory address is found, the debugger 112 essentially places a breakpoint at that particular memory address in the plurality of memory addresses 216.

Figure 3B:
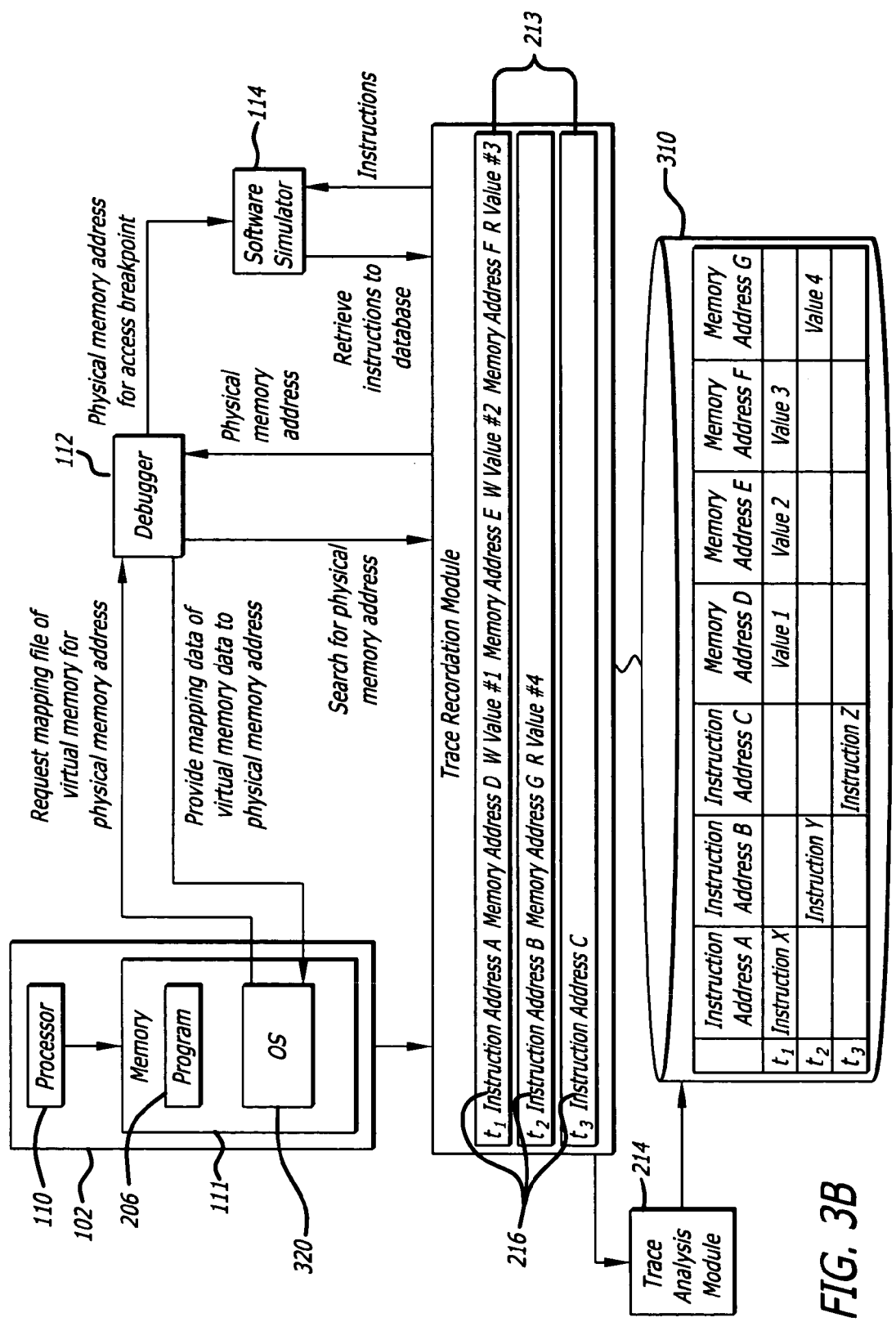
FIG. 3B illustrates a configuration, which maps virtual memory addresses to physical memory addresses.

FIG. 3B illustrates a configuration, which maps virtual memory addresses to physical memory addresses. This configuration is helpful in some systems for halting simulation of execution at an access breakpoint.

In one embodiment, a read access breakpoint can be provided to the software simulator 114. Some systems only have a listing of physical memory addresses that are read from and/or written to. Therefore, a user can select a memory address for a read access breakpoint which the debugger 112 can provide to the simulator 114. In one embodiment, the simulator 114 stores the memory address in a list with other breakpoints. Accordingly, the simulator 114 can check each instruction that the simulator 114 simulates prior to simulation to determine if the memory address associated with the read access breakpoint appears as a read in the trace data listing 213 for the given instruction. For example, the trace data listing 213 can have an "R". If the memory address appears in the trace data listing 213, the simulator 114 halts execution prior to the simulation of the execution of the given instruction.

In one embodiment, a write access breakpoint can be provided to the software simulator 114. Some systems only have a listing of physical memory addresses that are read from and/or written to. Therefore, a user can select a memory address for a write access breakpoint which the debugger 112 can provide to the simulator 114. In one embodiment, the simulator 114 stores the memory address in a list with other breakpoints. Accordingly, the simulator 114 can check each instruction that the simulator 114 simulates prior to simulation to determine if the memory address associated with the write access breakpoint appears as a write in the trace data listing 213 for the given instruction. For example, the trace data listing 213 can have a "W". If the memory address appears in the trace data listing 213, the simulator 114 halts execution prior to the simulation of the execution of the given instruction.

However, some computer systems use both physical memory addresses and virtual memory addresses. Although the trace data normally only lists physical memory addresses, the debugger 112 that works in conjunction with these computer systems will likely provide both physical memory addresses and virtual memory addresses to the user. By the term virtual memory address, one of ordinary skill in the art will recognize that the operating system pretends either that the memory 111 organizes data in a certain manner or has an additional set of memory locations. These virtual memory addresses are associated with physical memory addresses. In one embodiment, these virtual memory addresses provide information on where to find the stored data somewhere else in the memory 111. In another embodiment, these virtual memory addresses provide information on where to find the stored data on a disk. When the processor 110 has to read or write to a virtual memory address, the processor 110 accesses the physical memory address that the operating system 320 has associated with virtual memory address.

Once the programmer selects a memory location for an access breakpoint, the debugger 112 performs a mapping from a virtual memory address that corresponds with a physical memory address. When a programmer provides an access breakpoint to the debugger 112, the programmer is providing a virtual memory address. However, the trace data listing 213 only lists the physical addresses to which the processor 110 reads or writes. Therefore, the debugger 112 performs a mapping.

In one embodiment, the debugger 112 maps the virtual memory address to the corresponding physical memory address by looking to the database 310 and reviewing the memory addresses for which the operating system 320 translation tables are stored. The operating system provides a mapping table that records what physical memory address the operating system assigned to a particular virtual memory address. The debugger 112 reviews the mapping table in the operating system to translate the virtual memory address associated with the access breakpoint into a physical memory address. In one embodiment, the debugger 112 then provides the physical memory address to the software simulator 114 which sets an access breakpoint so that the simulator 114 halts execution each time the memory location of interest is accessed.

In one embodiment, the mapping table is stored on an external computer readable medium. In another embodiment, the mapping table is stored in a file. If the mapping values have been permanently assigned, a file can be accessed to view the mapping table.

In one embodiment, the access breakpoint is a read access breakpoint that halts execution of the simulation each time the memory address is read from. In another embodiment, the access breakpoint is a write access breakpoint that halts execution of the simulation each time the memory address is written to.

In one embodiment, the trace recordation module 212 inserts the breakpoints in the database 310 when composing the database 310. The trace recordation module 212 receives the physical memory address from the debugger 112. For each access of the memory address in the trace data listing 213, the trace recordation module 212 inserts a marker into the database 310 to halt simulation. The software simulator 114 then halts simulation if there is an attempt by the simulator 114 to set the simulated memory values to those at the point in the database 310.

In another embodiment, the trace data listing 213 is annotated so that the virtual memory address corresponding to the physical memory address is also listed. The trace recordation module 212 provides the trace data listing 213 to the debugger 112, which then searches through the trace data listing 213 to determine what physical memory addresses are present in the trace data listing 213. The debugger 112 performs a translation for each of the physical memory addresses into a virtual memory address. In one embodiment, the debugger 112 annotates the trace data listing 213 and provides the annotated trace data listing 213 to the trace recordation module 212. In another embodiment, the debugger 112 provides a list of the translations to be performed and the trace recordation module 212 actually performs the annotation of the trace data listing 213.

In one embodiment, the debugger 112 provides a run command to the software simulator 114 which simulates the execution of instructions from the current simulated time until the software simulator attempts to execute a machine instruction in the trace data that has a breakpoint at a memory address which is modified or accessed or until the end of trace data is reached. In another embodiment, the debugger 112 provides a run backward command to the software simulator 114 until the software simulator 114 attempts to execute the machine instruction in the trace data that has a breakpoint at the associated source code instruction or until the beginning of the trace data is reached. In another embodiment, the debugger 112 receives a plurality of breakpoints. In one embodiment, the breakpoints in the plurality of breakpoints are different. For instance, two different execution breakpoints can be set. Further, an execution breakpoint and a write access breakpoint can be set. One of ordinary skill in the art will recognize that many different types of breakpoints can be used as the plurality of breakpoints. The simulator 114 attempts to simulate the execution of the plurality of machine instructions stored in the plurality of memory addresses 216 until one of the plurality of breakpoints is reached.

In essence, the debugger 112 provides the user with an interface to a recording of the execution of the processor 110 in a given time period. The user is given the appearance of using a traditional debugger, with which he or she is familiar. While the user provides the same commands to the debugger 112 as the user would provide to a traditional debugger, the debugger 112 is actually navigating through a recordation of the program to be debugged rather than controlling an execution of the program to be debugged. Accordingly, the actual implementation remains transparent to the user.

The debugger 112 has more robust capabilities than a traditional debugger. Much like a VCR, the debugger 112 allows the user essentially to rewind and fast-forward through the recordation of the trace data. In addition, the debugger 112 greatly enables a programmer's ability to find the more difficult types of bugs.

Accordingly, the debugger 112 helps find irreproducible bugs by essentially making the irreproducible bugs reproducible. Much of the difficulty in finding an irreproducible bug is that the irreproducible bug rarely manifests itself after the program crashes. At the time of the crash, the programmer can either debug the program at its present state or restart the program and attempt to use tools such as breakpoints to determine the bug. The difficulty with debugging in the present state when the crash occurs is that there is not much flexibility for the programmer to analyze previous instructions and previous memory values prior to the crash. The problem with restarting the program is that the bug is irreproducible and will likely not manifest itself again for a very long period of time. The manifestation of the irreproducible bug is essentially lost when the program is restarted.

The trace module's 212 recordation of the execution of the processor 110 effectively prevents the manifestation of the irreproducible bug from being lost. The state of the program at the time of the crash and at times previous to the crash is reflected in the trace data. There is a strong likelihood that the irreproducible bug is somewhere in the trace data. The programmer can perform forward and backward simulations until the bug is reached.

In one embodiment, the debugger 112 provides the programmer with the ability to perform an enhanced binary search, which traditional debuggers are not capable of performing. A traditional debugger requires the programmer to set breakpoints in the source code and then restart the program from the very beginning. The program then executes until one or more breakpoints is reached and then presumably crashes or produces an undesirable result somewhere in between the breakpoints. The programmer then resets some breakpoints to cover this narrower range and must restart the program again and execute the program from the very beginning to the new set of breakpoints.

The enhanced binary searching methodology does not require the programmer to restart execution of the program from the very beginning. By navigating through a recordation of an execution as opposed to actually executing, the debugger 112 does not need to restart the program when a crash or undesirable result occurs.

In one embodiment, the programmer sets a before-breakpoint at a point that the programmer is sure is before the cause of the bug. The programmer then runs the program backward to the before-breakpoint. The programmer then sets an after-breakpoint that is after the manifestation of the bug. The programmer then sets a middle-breakpoint about halfway in between the before and after-breakpoints. The execution of the instructions between the before-breakpoint and the middle-breakpoint is simulated. If the error manifests itself between the before-breakpoint and the middle-breakpoint, the execution is simulated backwards to the before-breakpoint. The middle-breakpoint becomes the after-breakpoint and a new middle-breakpoint is set. The execution is then simulated forward from the before-breakpoint without having to restart the program. If the error manifests itself between the middle-breakpoint and the after-breakpoint, the execution is simulated backwards to the middle-breakpoint. Accordingly, the middle-breakpoint is then set as the before-breakpoint. A new middle-breakpoint is set about halfway in between the new before-breakpoint and the after-breakpoint. Accordingly, the execution can be simulated without having to restart the program. Further, the binary search reduces the amount of code to debug by half.

Another type of bug that the debugger 112 helps reproduce is the reproducible bug that takes a long time to reproduce. In order to reproduce a reproducible bug, the same conditions that occurred when the bug manifested itself may be needed. For instance, the manifestation of the bug may depend on a particular time of the day. Therefore, a programmer using a traditional debugger may take a long time to reproduce a manifestation of the bug. The debugger 112 is able to navigate through a recording that has the conditions in which the bug manifested itself. When the bug manifests itself, either the programmer chooses to stop the program or the program stops as a result of the bug. In one embodiment, the trace data is recorded up until the point that the bug manifested itself. In one embodiment, the trace data is sent to the host computer 124 to be processed by the trace recordation module 212. The debugger 112 can then be used to perform the enhanced binary search to efficiently find the reproducible bug that would otherwise take a long time to reproduce.

Another type of bug that the debugger 112 can be used to find is the bug that only manifests itself when the program is run at full speed. Traditional debugging methods simply do not work because as soon as a traditional breakpoint is reached, the program is not executing at full speed and the bug may not manifest itself. With the trace recordation module 212, a recording of the execution of the processor 110 at full speed is taken. The debugger 112 can then navigate through the recording taken by the trace recordation module 212 because the bug has been captured in the recording. Unlike traditional debuggers, the debugger 112 can use breakpoints to find the type of bug because the speed of the simulation of the execution of the trace data does not affect whether the bug appears in the trace data. The bug has been recorded in the trace data. Accordingly, the programmer can use the debugger 112 to move forward and backward through the recording, even at slow speeds, to find the bug. Even though the simulated debugging process simulates running and stopping the program, the bug manifests itself each time just as it did when the program was actually run. Therefore, the debugger 112 allows bugs that only manifest themselves when run at full speed to be debugged just as easily as an ordinary bug.

The debugger 112 is also helpful in discerning corrupted data. Sometimes the instruction at which a bug manifests itself is not the cause of the bug but rather the data that the processor used to perform the instruction. The data had been corrupted at some earlier source line. This bug may or may not be reproducible. When a programmer encounters this bug, the programmer can use a traditional debugger to set an access breakpoint and restart the program to do a forward execution until the access breakpoint is reached. However, the data may not be corrupted during the programmer's subsequent execution because the bug may be an irreproducible bug or a reproducible bug that takes a long time to reproduce.

Whether or not the bug is an irreproducible bug or a reproducible bug that takes a long time to reproduce, the debugger 112 allows the programmer to efficiently find the cause of the corrupted data. In one embodiment, the programmer uses the debugger 112 to set a write access breakpoint on the corrupted memory location. The debugger 112 then allows the programmer to simulate an execution backward from the manifestation of the bug until the write access breakpoint is reached without having to restart the program. The simulation can be moved backward to each instruction at which the write access breakpoint halts the simulation of the execution until the bug is found.

The debugger 112 is also helpful in simplifying a programmer's strategy for where to set breakpoints and how many breakpoints to set. With a traditional debugger, the programmer does not want to set a breakpoint too far along in the program because then the bug may be passed when the program executes. If the bug is passed, the programmer has wasted time and must restart the program from the beginning. Similarly, if the programmer places too many breakpoints to make sure that the bug manifests itself before one breakpoint, debugging becomes a very slow process. The debugger 112 allows the programmer to freely set breakpoints without being concerned about having to restart the program if the breakpoint is placed past the manifestation of the bug. If the breakpoint is placed too far into the source code, the programmer can use the debugger 112 to simulate backward to the last breakpoint, set one or more breakpoints that are not so far along in the source code, and simulate forward to the new breakpoints without having to restart the program.

The debugger 112 is also helpful for determining a path that the source code took. For instance, a programmer will sometimes place a breakpoint into the code of a function to see if a function call was made to the function. However, the source code may have multiple calls to the same function. Finding which call involved the function at the breakpoint is not easy with a traditional debugger. The programmer can analyze the state of the program or can even set breakpoints at each of the function calls and restart the program. The debugger 112 simplifies the process of determining the path selected by the source code. For instance, when a breakpoint is set in a function, the programmer can use the debugger 112 to simulate backward to the call that invoked the function. Therefore, the debugger 112 provides a fast and simple way to find the path selected by the source code.

Although the trace data generally provides an ordered listing of the machine instructions performed by the processor 110, the trace data usually has some imperfect portions. When the amount of trace data that is being recorded becomes large, overflow may occur. There may be gaps in portions of the trace data. Further, some machine instructions may be listed out of order. Software tools exist to help correct these errors. Even with the errors, the majority of the trace data is reliable.

In one embodiment, the gaps in the trace data can be filled in through a correction methodology. First, the trace data is analyzed to determine if there are any gaps. When the trace recordation module 212 is recording the execution of the processor 110, the trace recordation module 212 stores the machine instructions and the memory values in a temporary buffer prior to composing the trace data in the trace data listing 213. In some instances, the temporary buffer becomes full, and the trace recordation module 212 is unable to record one or more machine instructions and/or memory values. Although the trace recordation module 212 will be unable to record the trace data during this overflow, the trace recordation module 212 is able to record that an overflow problem occurred for a given instruction. Therefore, the trace recordation module 212 knows what instruction is supposed to be performed, but does not have a recording of the execution of the instruction. In one embodiment, the debugger 112 accesses the database 310 to determine the state of the program at a time prior to the overflow. The software simulator 114 then determines how the execution of the instruction not performed as a result of the overflow would affect the memory 111 and registers of the processor 110. The trace recordation module 212 then records the values in the database 310 for the time period in which the overflow occurred.

Figure 3C:
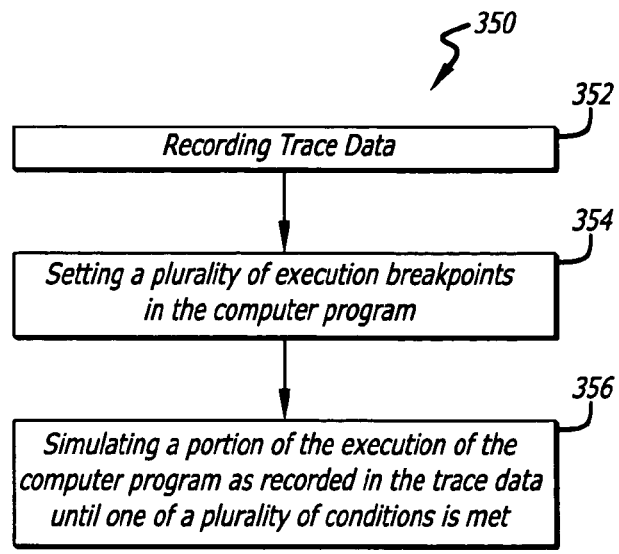
FIG. 3C illustrates a process for simulating the execution of the computer program as recorded within the trace data.

FIG. 3C illustrates a process 350 for simulating the execution of the computer program 101 as recorded within the trace data. At a process block 352, the process records trace data from an execution of the computer program 101 for a time period. Accordingly, at a next process block 354, the process 350 sets a plurality of execution breakpoints in a computer program 101. Finally, at a process block 356, the process simulates a portion of the execution of the computer program 101, as recorded in the trace data until one of a plurality of conditions is met. In one embodiment, one of the plurality of conditions is an attempt to execute a machine instruction associated with one of the plurality of execution breakpoints.

Figure 4:
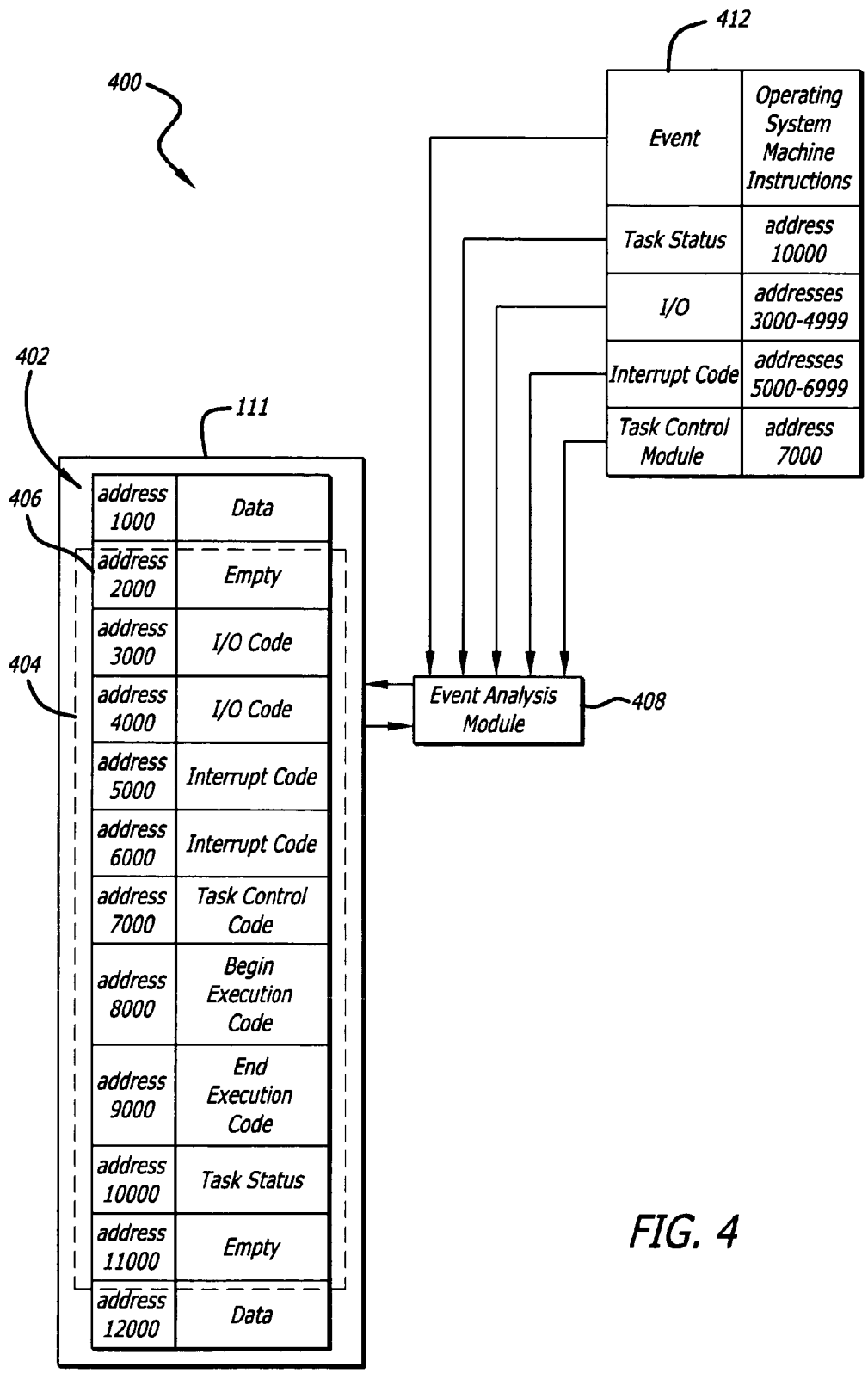
FIG. 4 illustrates an event analysis configuration in which the trace data that is gathered by the trace module or other recording mechanism can be used to display information about events.

FIG. 4 illustrates an event analysis configuration 400 in which the trace data that is gathered by the trace recordation module 212 or other recording mechanism is used to display information about operating system events. An operating system event is an event that requires the operating system 320 to respond by executing machine instructions to process the event.

The memory 111 includes a storage portion 402 that has a series of addresses 406 with associated data. A part of the storage portion 402 is dedicated to storing the machine instructions and data of an operating system 320. The operating system 320 is a software program stored in the memory 111 that the processor 110 executes to provide services to the program 101. For instance, when the program 101 needs to interact with hardware, such as a disk for input/output ("I/O"), the program 101 can invoke operating system machine instructions to read or write to disk. The operating system machine instructions are stored in various memory locations that can be accessed by the associated memory address.

An interrupt is a hardware initiated function call to an operating system function caused by an external event. For instance, when the user enters input through the input device 106, such as a keyboard, the input device 106 will invoke a function call to the operating system to process the data that is inputted.

The program 101 may consist of one or more tasks. A task is created and managed by the operating system 320. The processor 110 executes a task's machine instructions one at a time. There may be many tasks and interrupts but the processor 110 can only execute one task or interrupt at a time. All of the tasks and interrupts compete for access to the processor 110 to execute their respective machine instructions. For a task to continue its execution all other tasks and interrupts must stop executing.

Traditional systems require that additional machine instructions be added to the operating system in order for information about events to be gathered. These additional machine instructions invariably affect the performance and the behavior of the computer system, often to a significant degree. For instance, the computer system is usually slowed down, sometimes considerably. Further, the computer system often behaves differently than if the event data was not being gathered. The effect of this change in behavior can sometimes be large enough to mislead a programmer into making incorrect decisions about how to debug the program 101.

The event analysis configuration 400 allows event data to be gathered without degrading the performance of the computer 102. The event analysis configuration 400 accomplishes this by analyzing trace data instead of placing additional machine instructions in the operating system. The event analysis configuration 400 includes an event analysis module 408 that analyzes trace data and gathers event data to be displayed. In one embodiment, the event analysis program 400 is the trace recordation module 212. In another embodiment, the event analysis program 408 works in conjunction with the trace recordation module 212.

In one embodiment, the trace data recorded by the trace recordation module 212 includes a record of the execution of machine instructions from the operating system as well as the program 101. If the program 101 makes an operating system service call, the trace data listing 213 will have a sequence of machine instructions for the program 101 followed by a sequence of machine instructions associated with operating system followed by more machine instruction from the program 101. In addition, the trace data listing 213 includes the addresses and values of the memory 111 that the operating system accesses and modifies.

In one embodiment, the event analysis program 408 maintains or has access to a selected event list 412. The selected event list 412 includes events for which event data is to be displayed. Many events take place within a computer system, and the display of event data for every event might make debugging a confusing process. The user may select some of the events that are likely to be of interest for debugging purposes. The event analysis program 408 places these events on the selected event list 412.

The event analysis module 408 obtains from the operating system 320 debugging information such as the addresses of some or all of the machine instructions in the operating system that service each of the events listed on the selected event list 412. The event analysis program 408 stores the operating system machine instruction addresses corresponding to each event in the selected event list 412. In one embodiment, a separate table from the selected event list 412 can be created to reflect the operating system machine instruction that is associated with each of the selected events.

Figure 5:
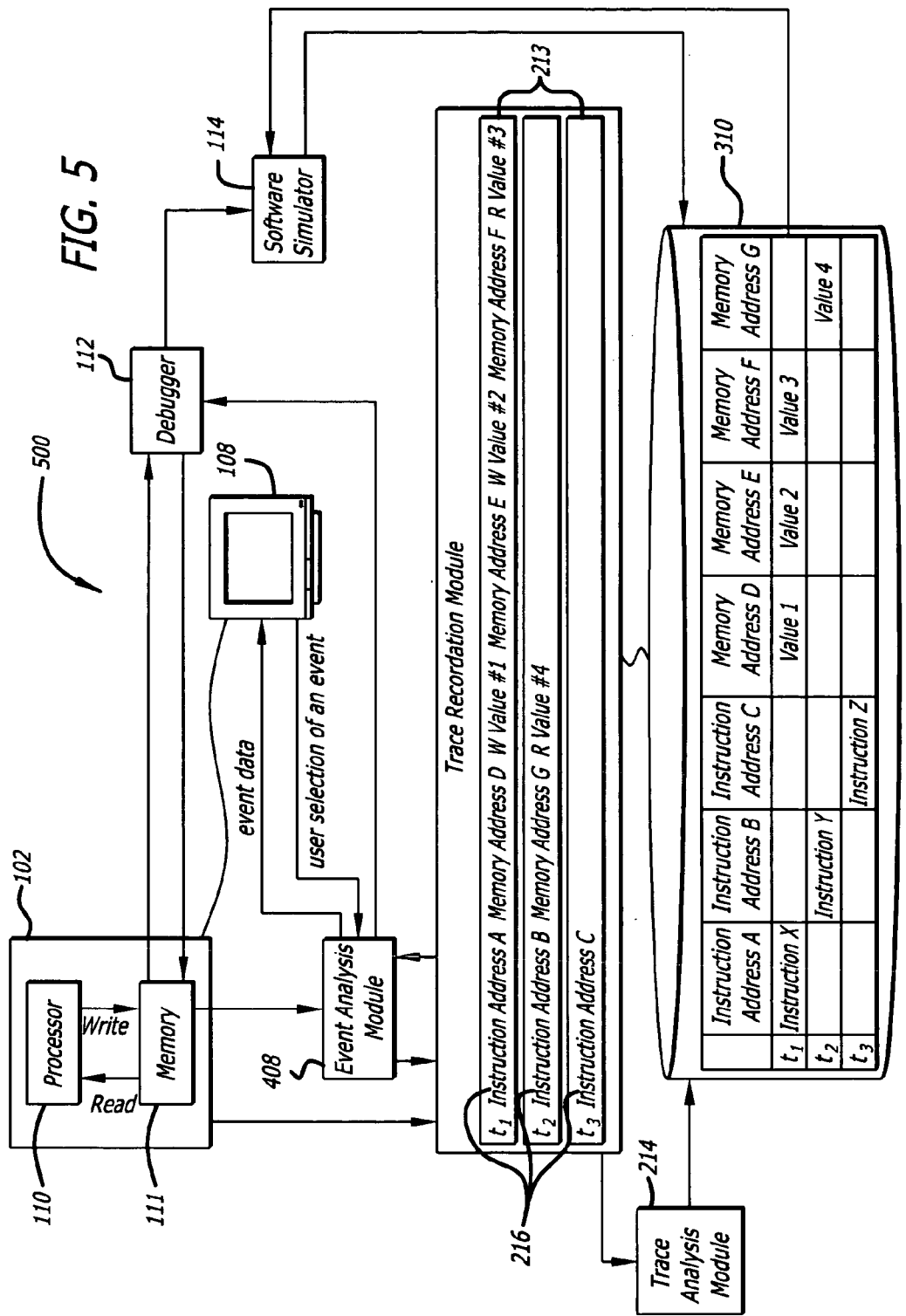
FIG. 5 illustrates an event debugging system.

FIG. 5 illustrates an event debugging system 500. In one embodiment, the event analysis program 408 accesses the trace recordation module 212 to search the trace data listing 213 for operating system machine instruction addresses that correspond to events listed in the selected event list 412. If machine instruction addresses corresponding to an event in the selected event list 412 are found in the trace data listing 213, the processor 110 executed operating system machine instructions for a selected event during the time that the trace data records for those machine instructions.

The event analysis program 408 is programmed with the knowledge of where in the memory 111 or registers the arguments and other descriptive information about the event is stored at the time of the event. The event analysis program 408 then obtains the values of the arguments and other descriptive information about the event by requesting from the database 310 the values of the associated memory and register values at the time the operating system processed the event.

In one embodiment, a dedicated memory address or register in the operating system 320 stores an identification of the task that is currently running. The event analysis program 408 searches the trace data listing 213 for writes to this address. Each write to this address represents a change in the task that is currently executing. Using this information, in one embodiment, the event debugging system 500 records in the trace data listing 213 which task is executing for each machine instruction in the trace data. In another embodiment, the event debugging system 500 records the task in a separate list. In yet another embodiment, the event debugging system 500 records the task in the database 310. In another embodiment, the current task can be determined by searching the trace data listing 213 for machine instructions from the operating system context switch function that is responsible for switching the task that is executing. The event analysis program 408 obtains the identification of the task which begins running by requesting from the database 310 the value of the registers or memory locations in which the identification of the task is passed to the operating system context switch function when the operating system context switch machine instructions are executed.

The event analysis module 408 takes the data that the event analysis module 408 has extracted and organized into event data and provides the event data to the output device 108. For instance, the event data can be the name of the event, the name of the task that executed the event, the time that the event was executed, and the arguments that were passed to the operating system code to execute the event. The output device 108 can be a graphical user interface that provides a display for the event data that allows the user to view and navigate through the event data. In one embodiment, the event analysis program 408 provides the event data to the debugger 112 which then provides the event data to the output device 108. In another embodiment, the event analysis module 408 is a part of the debugger 112. In yet another embodiment, there is no need for the event analysis module 408 because the debugger 112 performs the functions of the event analysis module 408.

Figure 6A:
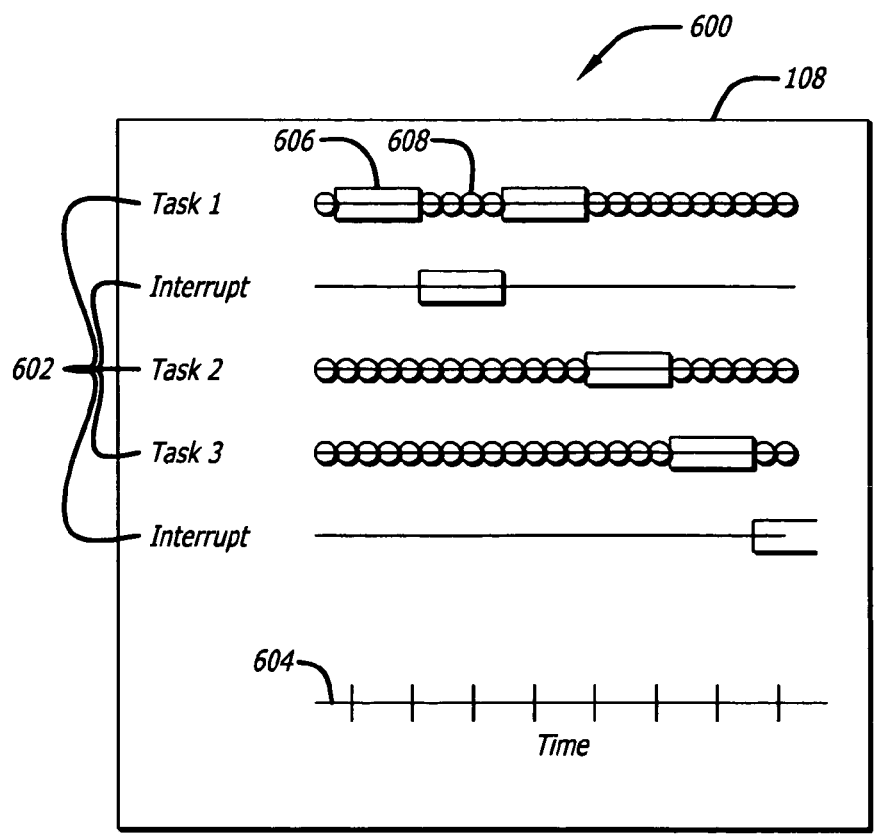
FIG. 6A illustrates an event display that can be viewed by a user debugging the program.

FIG. 6A illustrates an event display 600 that can be viewed by a user debugging the program 101. Once the event data is displayed on the output device 108, the user can interact with the event data to debug the program 101. The event display has a horizontal time line 604 that indicates the time running from left to right across the display. Using the time line 604, a viewer can determine the time that an event occurred. The event display 600 displays a horizontal line for some or all of the tasks or interrupts that the event analysis program 408 determined to be executing in the trace data. Each horizontal line represents the execution of the corresponding task at the time indicated by the time line 604. In one embodiment the line representing the task is green when the task is executing and black when it is not executing. Various symbols can be used to indicate event data. For instance, a block 606 can be used to indicate that an event occurred at a particular time. If an event is associated with one task, such as a task request for an operating system service, the event indication appears on or near the line associated with the task at the point corresponding to the time of the event. Task one began executing but stopped temporarily because an Interrupt began executing. When the Interrupt stopped executing, task one continued executing. When task one was finished executing, task two began executing. In one embodiment, each event has a particular symbol that indicates the type of event that is being performed. For instance, a triangle may be placed next to task one to indicate that task one is indicating an event to perform I/O. In another embodiment, events can be color coded to indicate a particular type of event. For instance, task one can be color coded green to indicated that task one is performing an I/O.

In one embodiment, the user can select one of the events to debug by selecting the event on the output device 108. For instance, the user can use a mouse pointer to click on the event to select it. This selects the time of the event and the task associated with the event. In another embodiment, the user can select a time and a task by clicking on a task line at a point that corresponds to a time.

Once the task and time are selected to debug, the debugger 112 initiates a debugging session for the selected task at the selected time. The debugger 112 displays a window with the source code that was executing at the time in the selected task. The debugger 112 allows the user to examine the value of variables, registers, and memory locations as they were at that time. The debugger 112 also allows the user to place breakpoints anywhere in the source code and run the execution of the task forwards or backwards from that point and utilize the debugger's other capabilities normally available when debugging a live task.

The event display provides the programmer with the ability to obtain a high level view of what went wrong with the execution of the program 101 prior to attempting to debug the problem. The event display assists the programmer in determining where to begin debugging or placing breakpoints. The event display provides the programmer with an idea of where the cause of the bug may be. For instance, if the programmer determines that a particular task has stopped running for a long period of time, the programmer can then debug the task shortly before it stopped running to determine the cause. In addition, the programmer can simulate the execution of the task both forwards and backwards in order to narrow down the cause of the bug. In one embodiment, the simulator 114 accesses the database 310. In another embodiment, the simulator 114 accesses the trace recordation module 212, which then accesses an annotated trace data listing 213 that facilitates the simulator 114 simulating execution forward and backward. Further, the programmer can use the modified binary searching method on the execution of the task.

Figure 6B:
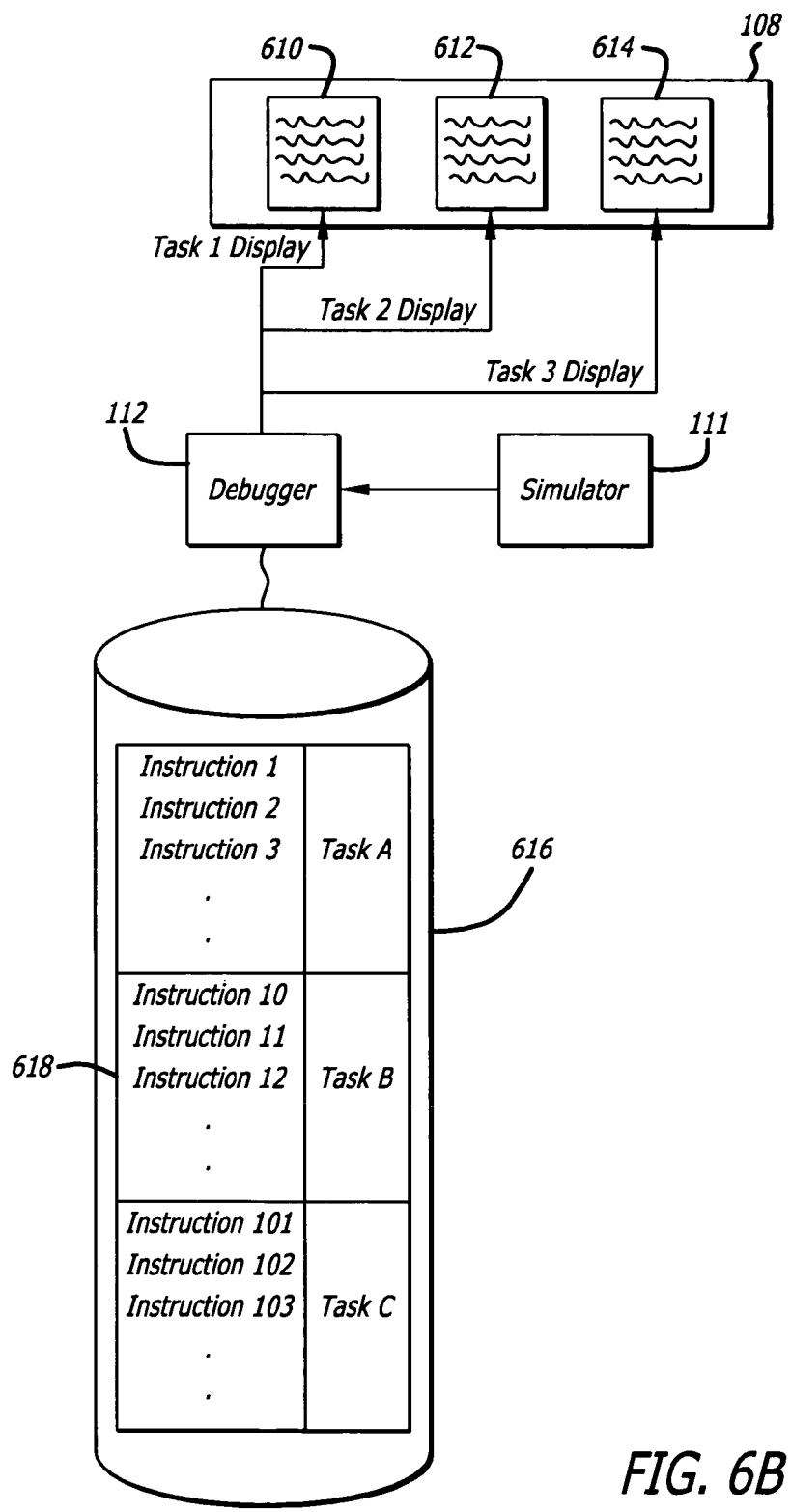
FIG. 6B illustrates how the debugger can analyze multiple tasks.

FIG. 6B illustrates how the debugger 112 can analyze multiple tasks. Multiple windows can be displayed, each for debugging a particular task. Each window will only show the execution of the source code for the particular task associated with the window. The trace data provides the task context switches and therefore allows each instruction and each value in the trace data to be identified with the task that executed the instruction. Using the knowledge that the debugger 112 has of which task executed an instruction, the debugger 112 updates the correct window associated with the simulation of the execution of the program 101 by the simulator 114.

For instance, the debugger 112 can receive simulation data from the simulator 114 to be displayed on the output device 108. For instance, the debugger 112 can then update a task one display with the simulation of a first sequence of instructions, a task two display with the simulation of a second sequence of instructions, and a task three display with the simulation of a third sequence of instructions.

Figure 7:
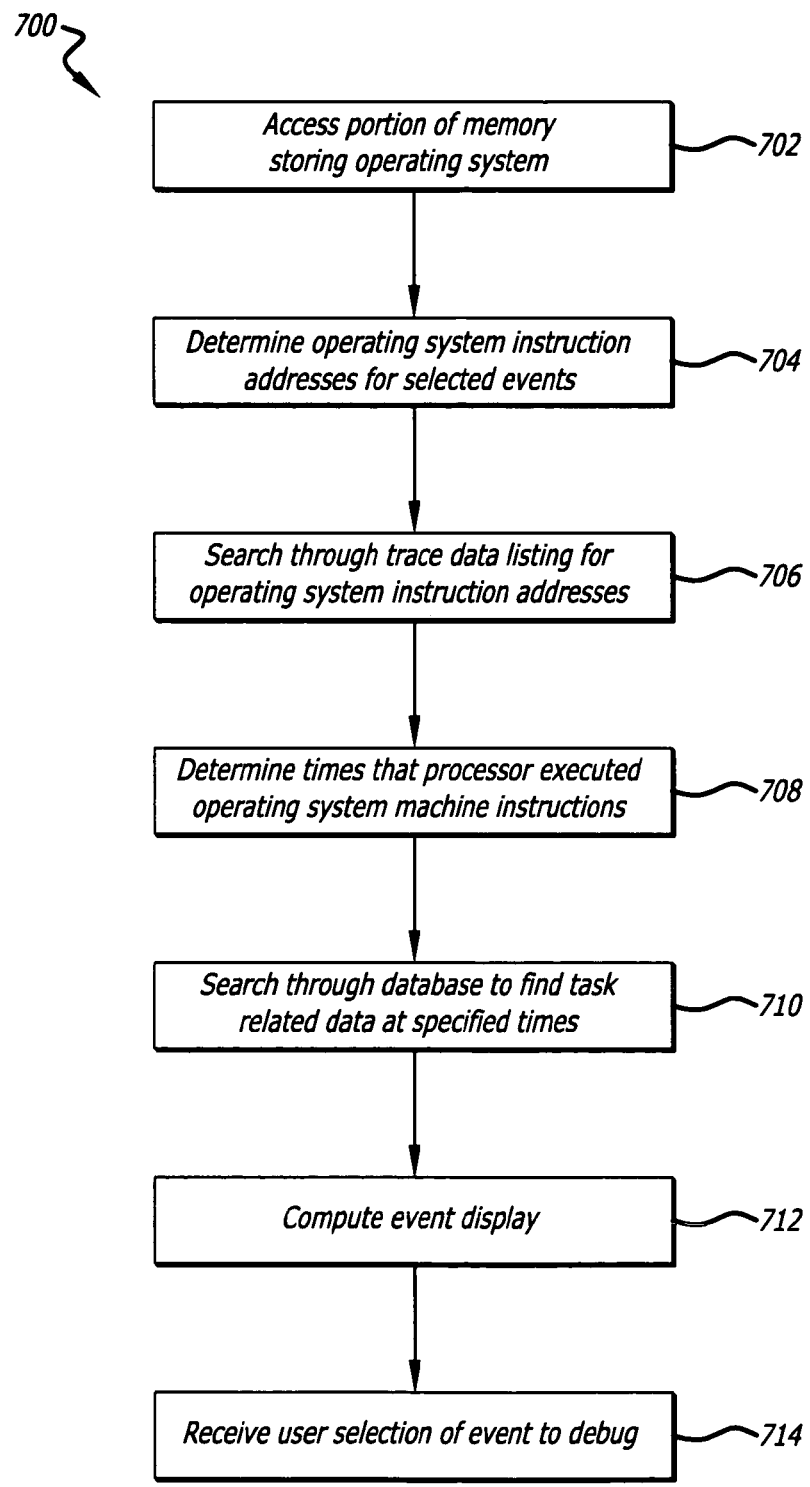
FIG. 7 displays a process for debugging an event display.

FIG. 7 displays a process 700 for implementing an event display. At a process block 702, the operating system 320 object code is accessed in the memory 111. Operating system machine instruction addresses for selected events are determined at a process block 704. Further, at a process block 706, the trace data listing 213 is searched through for execution of machine instructions associated with events. The execution of the machine instructions can be found by looking for the memory addresses that store the machine instructions in the trace data listing 213. At a process block 708, the times at which the events were executed are determined. In addition, at a process block 710 the database 310 is searched through to find task related data at the specified times. At a process block 712, the event display is computed. Further, at a process block 714, user selection of the event to debug is received.

Figure 8:
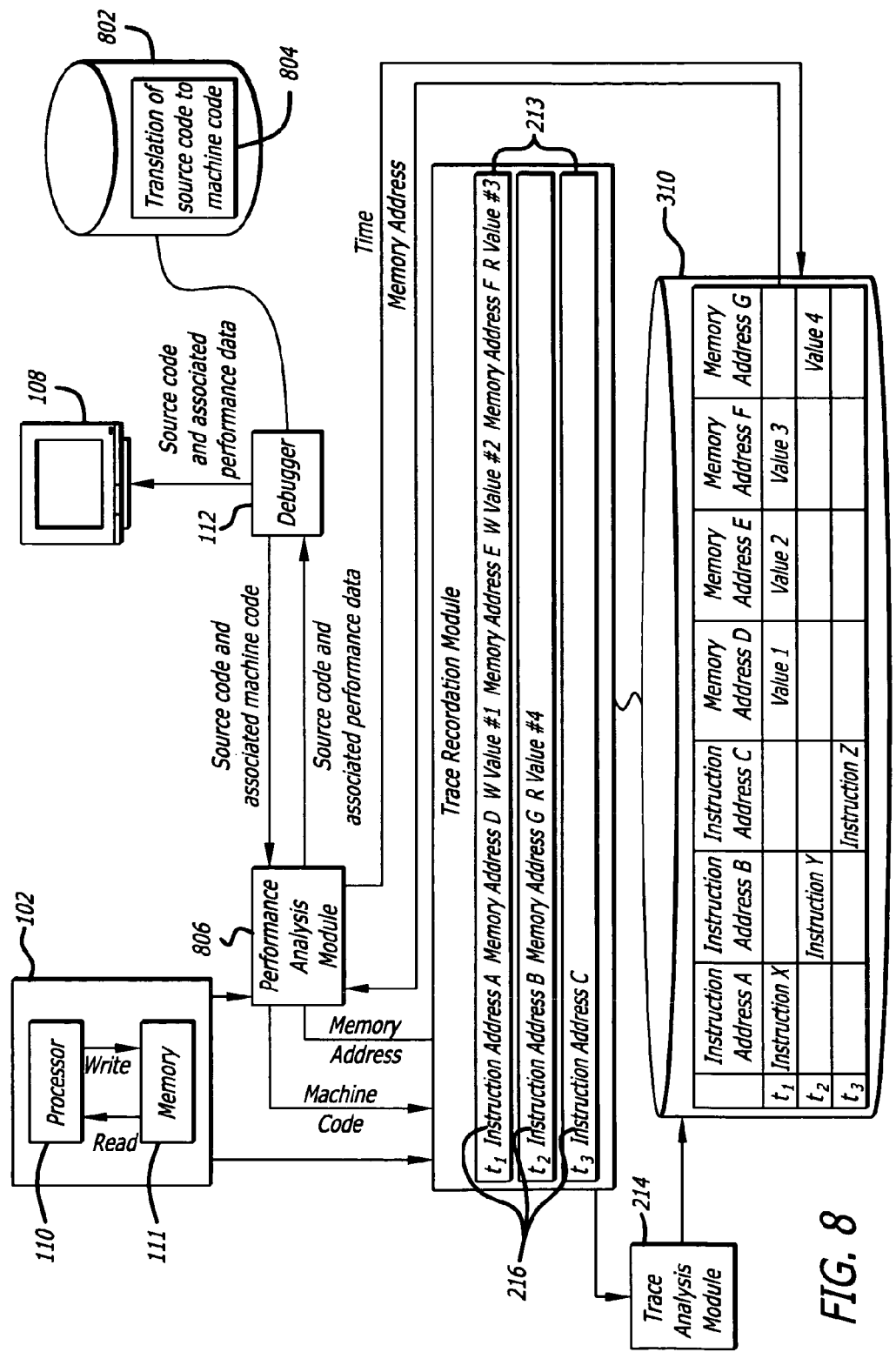
FIG. 8 illustrates a performance display configuration which displays performance data on the output device.

FIG. 8 illustrates a performance display configuration 800, which displays performance data to the output device 108. Performance data includes data about the amount of time that the processor 110 executed a function, task, source line, or instruction during the time represented by the trace data listing 213. The performance data can be a quantitative figure or can be a fraction or percentage of the processor's total execution time.

The performance analysis module 806 uses the trace data listing 213 to create a table which records for each machine instruction address in the program 106 the total amount of time that the processor 110 spent executing the machine instruction at that address during the time period represented by the trace data listing 213. Each instruction in the program may be executed many times. In one embodiment, for each time that the instruction was executed, there is an entry in the trace data listing 213 that records the time that the instruction was executed. In another embodiment, there is an entry in another table. The performance analysis module 806 processes each machine instruction execution represented in the trace data listing 213 by subtracting the execution time of the next instruction from the execution time of this instruction. This represents the amount of time that the processor 110 spent executing this instruction. The time spent executing this instruction is added to the element of the table that represents the machine instruction address for this instruction. When all of the trace data listing 213 has been processed the table records for each machine instruction address how much total time the processor 110 spent executing the machine instruction at that address during the execution of the program recorded in the trace data listing 213.

In one embodiment, the performance analysis module 806 accesses a mapping file 804 that specifies which machine instruction addresses correspond to each source code line in the program. The performance analysis module 806 creates a table which records for each source line in the program the amount of time that the processor 110 spent executing that source line during the execution of the program recorded in the trace data listing 213. The performance analysis module 806 fills in each source line entry in the table by summing up the time spent executing each machine instruction that is part of the source line.

In one embodiment, the performance analysis module 806 accesses a mapping file 804 that specifies which machine instruction addresses correspond to each function in the program. The performance analysis module 806 creates a table which records for each function in the program the amount of time that the processor 110 spent executing that function during the execution of the program recorded in the trace data listing 213. The performance analysis module 806 fills in the entry for each function in the table by summing up the time spent executing each machine instruction that is part of the function.

In one embodiment, the performance analysis module 806 creates a table which records for each task in the program the amount of time that the processor 110 spent executing that task during the execution of the program recorded in the trace data listing 213. The trace data listing 213 specifies for each machine instruction execution what task was executing at the time. The performance analysis module 806 fills in the entry for each task in the table by processing the trace data listing, summing up the time spent executing each machine instruction executed by the task.

The performance analysis module 806 provides the performance statistics for each instruction, source line, function, and task to the debugger 112. The debugger 112 displays the associated instruction, source line, function, or task on the output device 108 with an annotation indicating the performance statistic. The performance annotation can be a measure of time such as milliseconds or seconds or it can be a percentage or fraction of the total execution time. In one embodiment, the debugger 112 receives an input for turning the display of the performance data on or off. In one embodiment, the performance data appears in a different color than the source code text to indicate performance data.

Figure 9:
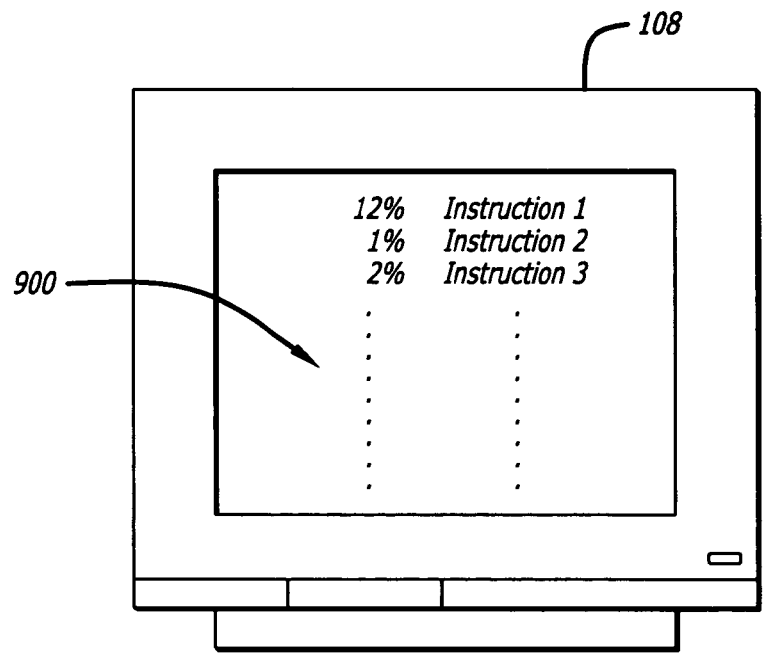
FIG. 9 illustrates a performance display that can be displayed on the output device.

FIG. 9 illustrates a performance display 900 that can be displayed on the output device 108. The performance display lists a sequence of instructions with the performance data appearing in the margins as annotations to each of the associated instructions.

Figure 10:
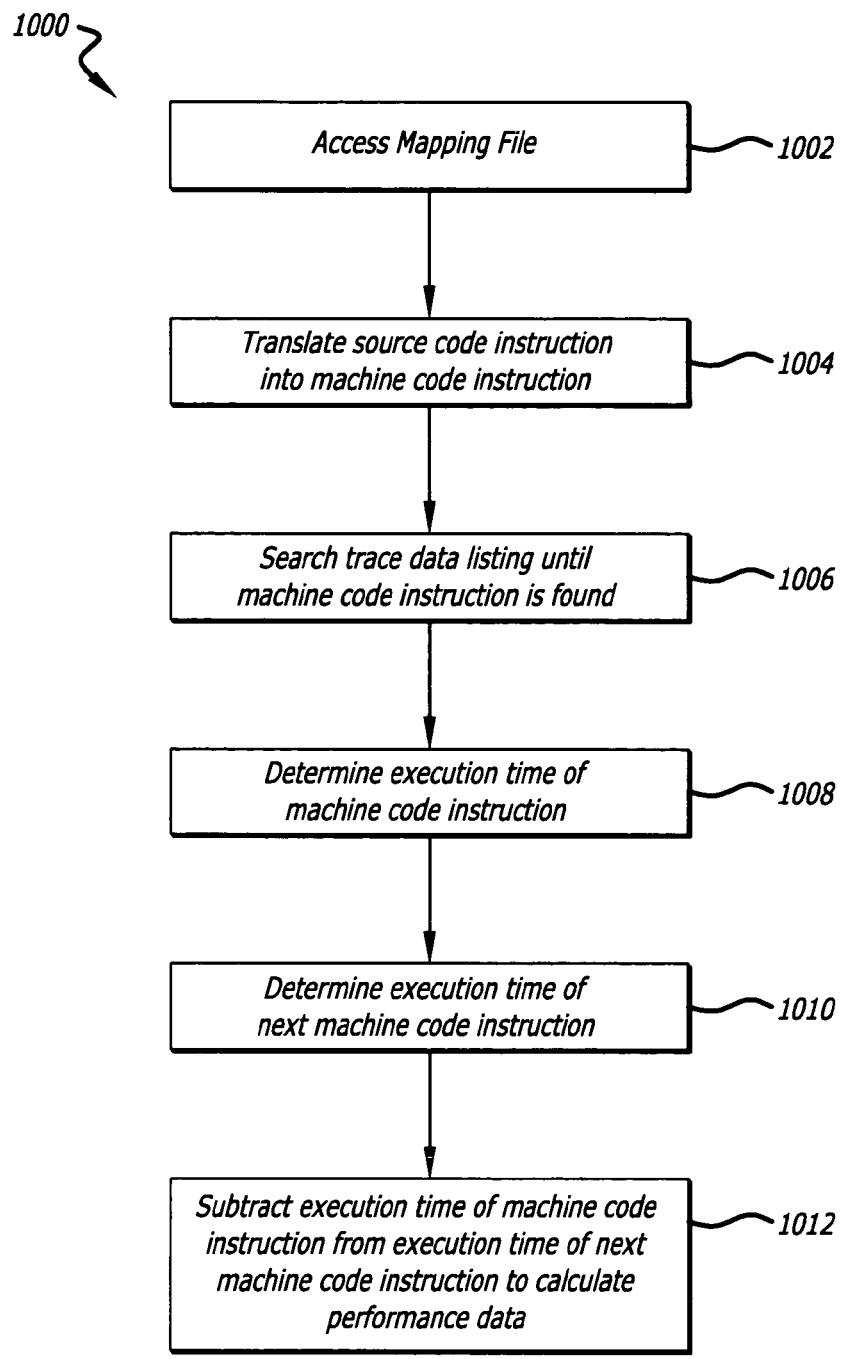
FIG. 10 illustrates a process for displaying a performance display.

FIG. 10 illustrates a process 1000 for displaying a performance display. At a process block 1002, the mapping file 804 is accessed. In one embodiment, the performance analysis module 806 translates the source code instructions into machine instructions at a process block 1004. The performance analysis module 806 then searches the trace data listing 213 until machine instructions are found at a process block 1006. Accordingly, the performance analysis module 806 determines the execution time of the machine code instruction that was found by analyzing the trace data listing 213 at a process block 1008. Further, the performance analysis module 806 determines the execution time of the next machine code instruction at a process block 1010. Finally, the performance analysis module 806 subtracts the execution time of the machine code instruction from the execution time of the next machine code instruction to calculate performance data such as the time spent by the processor 110 executing the instruction.

Figure 11:
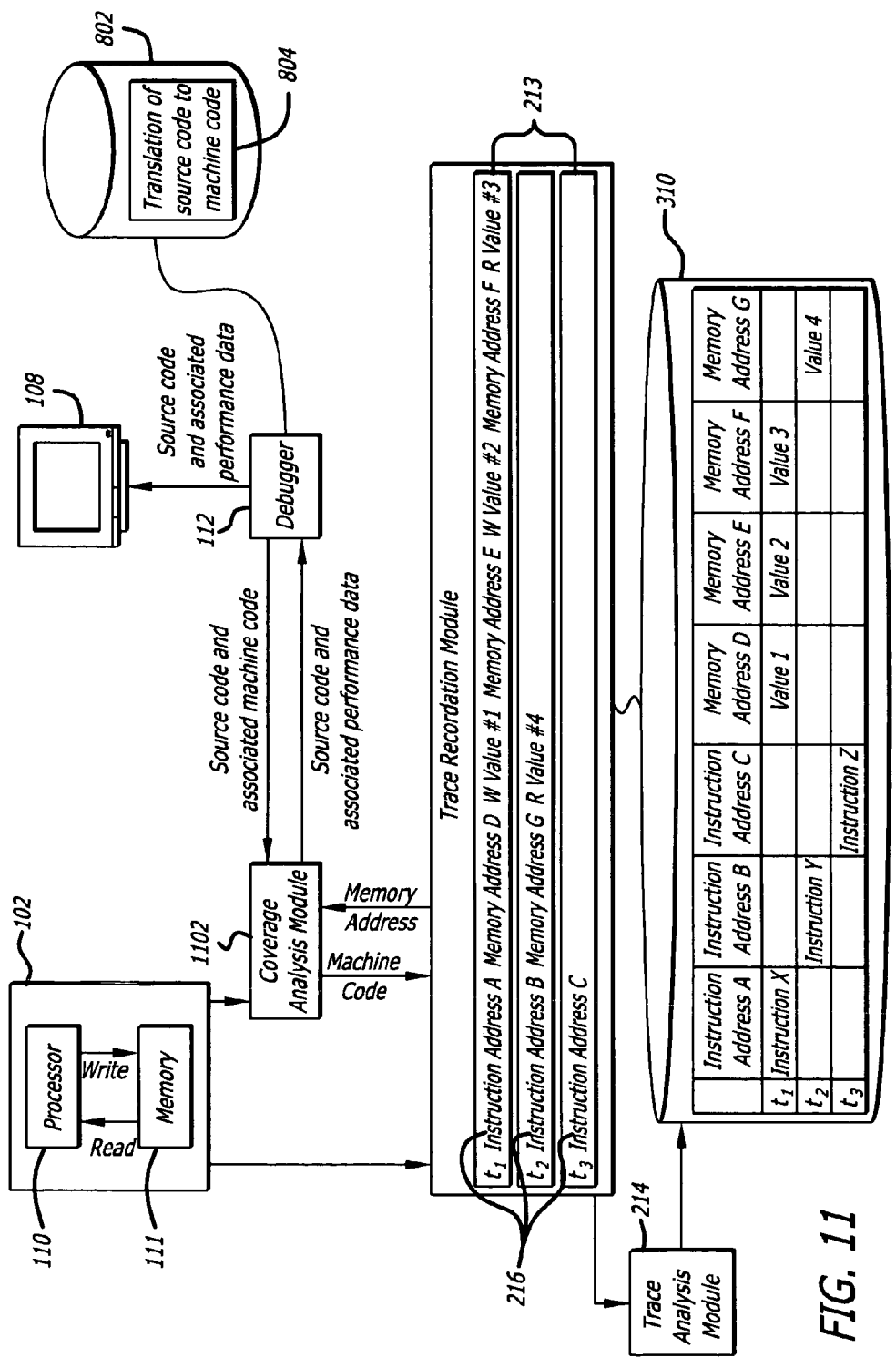
FIG. 11 illustrates a coverage analysis configuration.

FIG. 11 illustrates a coverage analysis configuration 1100. In one embodiment, the coverage analysis module 1102 counts how many machine instructions are included in each source line, and how many of the machine instructions that are associated with the source line had a non-zero execution time during the time represented by the trace data list 213, and from this it computes the percentage of machine instructions in the source line that were executed in the time represented by the trace data list 213. In one embodiment, the performance analysis module 806 counts how many machine instructions are included in each function, and how many of the machine instructions that are associated with the function were executed during the time represented by the trace data list 213, and from this it computes the percentage of machine instructions in the function that were executed in the time represented by the trace data list 213. A source line or function could have every machine instruction executed at least once, none of its machine instructions ever executed, or some fraction of its machine instructions executed. In one embodiment, the performance analysis module 806 can perform the functions described for the coverage analysis module 1102.

In one embodiment, a coverage display indicates whether a machine instruction, source line, function, or task was never executed by the processor 110 during the period recorded by the trace data listing 213. In one embodiment, the coverage data is an annotation in a display window of the source code or machine instructions, or both. The annotation indicates for each source line or machine instruction that it was never executed. In another embodiment, the coverage data is a highlighting of the machine instruction or source code to indicate that it was not executed. For example, the source code that was not executed may have a block around it. The source code that was not executed may also be color highlighted to indicate that the particular machine instruction or source code line was not executed. In one embodiment, the debugger 112 provides the coverage data with the associated machine instruction or source code line to the output device 108 to display the coverage data. In one embodiment, the coverage data annotates each source code line or function with the percentage or fraction of the machine instructions in the source code line or function were executed or not executed. In one embodiment, the coverage data annotates each source code line or function for which any instruction was not executed.

Figure 12:
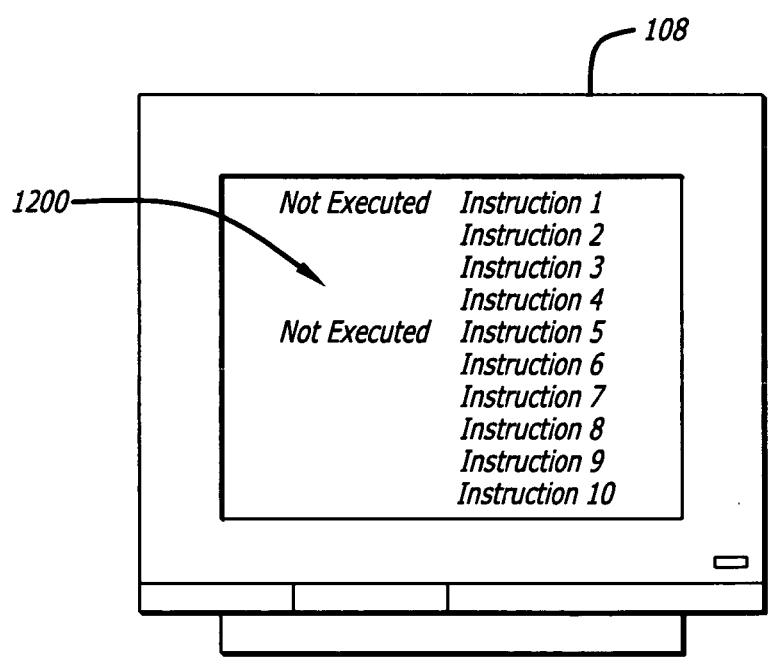
FIG. 12 illustrates a coverage display that is displayed on the output device.

FIG. 12 illustrates a coverage display 1200 that is displayed on the output device 108. In one embodiment, source code lines are listed in the order they appear in the program and they are annotated with coverage data that indicates which source code lines were not executed. In another embodiment and identification of the source code lines, machine instructions, functions, and tasks that were never executed are output to the display 108. In another embodiment an identification of the source lines for which every instruction was not executed are output to the display 108. In another embodiment, an identification of the functions for which every instruction was not executed are output to the display 108.

The main use of the coverage display 1200 is to validate testing procedures. If a series of tests fail to execute every machine instruction of every source line, function, and task in a program, then the tests have not tested those machine instructions, source lines, functions, or tasks. This indicates that the tests do not comprehensively test the program.

In one embodiment, an annotation is also provided to indicate the instructions that were executed. In another embodiment, an annotation is provided to indicate the instructions that were executed and an annotation is not provided to indicate that instructions were not executed.

Figure 13:
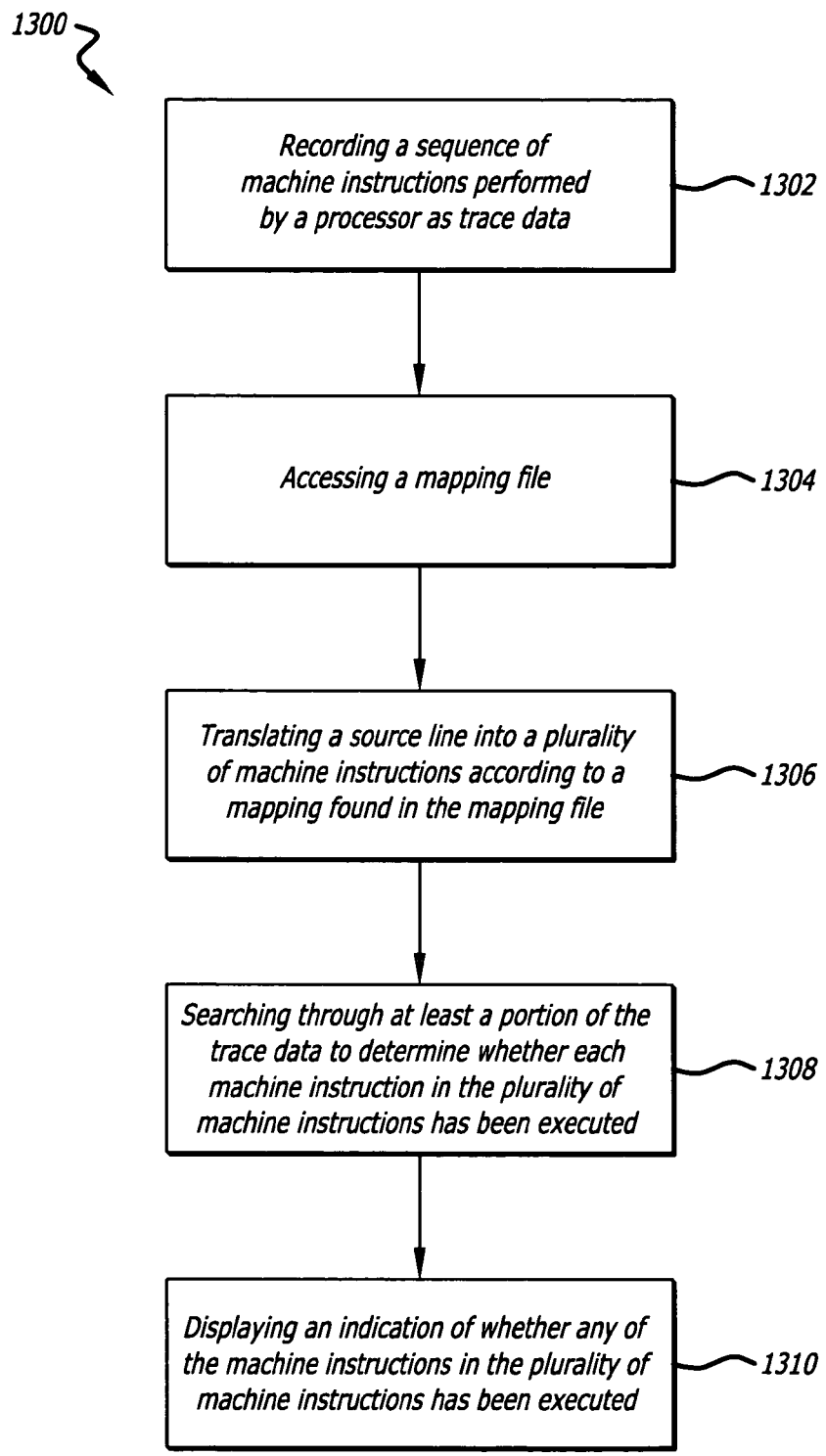
FIG. 13 illustrates a process for displaying coverage analysis data.

FIG. 13 illustrates a process for displaying coverage analysis data. At a process block 1302, the process 1300 records a sequence of machine instructions performed by a processor as trace data. Further, at a process block 1304, the process 1300 accesses a mapping file. In addition, at a process block 1306, the process 1300 translates a source line into a plurality of machine instructions according to a mapping found in the mapping file. At a process block 1308, the process 1300 searches through at least a portion of the trace data to determine whether each machine instruction in the plurality of machine instructions has been executed. Finally, at a process block 1310, the process 1300 displays an indication of whether any of the machine instructions in a plurality of machine instructions has been executed.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A method of finding an error in a computer program comprising:

recording trace data from an execution of the computer program for a time period;

setting a plurality of access breakpoints in the computer program;

simulating a portion of the execution of the computer program as recorded in the trace data in the same order with respect to the order in which the trace data was recorded until one of a plurality of conditions is met, wherein one of the plurality of conditions is an attempt to access a memory location associated with one of the plurality of access breakpoints; and inputting a start command to continue simulating a portion of the execution of the computer program as recorded in the trace data in the reverse order with respect to the order in which the trace data was recorded until one of a plurality of conditions is met, wherein one of the plurality of conditions is an attempt to access a memory location associated with one of the plurality of access breakpoints.

2. The method of claim 1, further comprising setting one or more additional breakpoints before inputting the start command.

3. The method of claim 2, further comprising providing a display command before setting one or more additional breakpoints.

4. The method of claim 3, wherein providing a display command comprises providing a display command to view the contents of a particular memory location.

5. The method of claim 3, wherein providing a display command comprises providing a display command to view a variable.

6. The method of claim 1, further comprising providing a display command before inputting the start command.

7. The method of claim 6, wherein providing a display command comprises providing a display command to view the contents of a particular memory location.

8. The method of claim 6, wherein providing a display command comprises providing a display command to view a variable.

9. A method of finding an error in a computer program comprising:
- recording trace data from an execution of the computer program for a time period;
- setting a plurality of access breakpoints in the computer program;
- simulating a portion of the execution of the computer program as recorded in the trace data in the same order with respect to the order in which the trace data was recorded until one of a plurality of conditions is met, wherein one of the plurality of conditions is an attempt to access a memory location associated with one of the plurality of access breakpoints; and
- providing a display command.

10. The method of claim 9, wherein providing a display command comprises providing a display command to view the contents of a particular memory location.

11. The method of claim 9, wherein providing a display command comprises providing a display command to view a variable.

12. A method of finding an error in a computer program comprising:
- recording trace data from an execution of the computer program for a time period;
- setting a plurality of access breakpoints in the computer program; and
- simulating a portion of the execution of the computer program as recorded in the trace data in the same order with respect to the order in which the trace data was recorded until one of a plurality of conditions is met, wherein one of the plurality of conditions is an attempt to access a memory location associated with one of the plurality of access breakpoints; and
- inputting a start command to continue simulating a portion of the execution of the computer program as recorded in the trace data in the same order with respect to the order in which the trace data was recorded until one of a plurality of conditions is met, wherein one of the plurality of conditions is an attempt to access a memory location associated with one of the plurality of access breakpoints.

13. The method of claim 12, further comprising setting one or more additional breakpoints before inputting the start command.

14. The method of claim 13, further comprising providing a display command before setting one or more additional breakpoints.

15. The method of claim 14, wherein providing a display command comprises providing a display command to view the contents of a particular memory location.

16. The method of claim 14, wherein providing a display command comprises providing a display command to view a variable.

17. The method of claim 12, further comprising providing a display command before inputting the start command.

18. The method of claim 17, wherein providing a display command comprises providing a display command to view the contents of a particular memory location.

19. The method of claim 17, wherein providing a display command comprises providing a display command to view a variable.

20. A method of debugging a computer program comprising:
- recording trace data from an execution of the computer program for a time period, wherein said trace data comprises a record of a sequence of instructions performed by a processor while executing a portion of said computer program, along with a read indicator and one or more affected memory address identifiers for one or more of said instructions that is associated with a read operation, and a write indicator and one or more affected memory address identifiers for one or more of said instructions that is associated with a write operation;
- setting an access breakpoint in the computer program; wherein said access breakpoint is associated with a memory location and is triggered upon detection of an attempt to access said memory location;
- simulating a portion of the execution of the computer program as recorded in the trace data in the same order with respect to the order in which the trace data was recorded until detecting an attempt to access a memory location associated with said access breakpoint; and
- inputting a start command to continue simulating a portion of the execution of the computer program as recorded in the trace data in the reverse order with respect to the order in which the trace data was recorded until one of a plurality of conditions is met, wherein one of the plurality of conditions is an attempt to access a memory location associated with one or more of a plurality of breakpoints.

21. The method of claim 20, further comprising providing a display command before inputting the start command.

22. The method of claim 21, wherein providing a display command comprises providing a display command to view the contents of a particular memory location.

23. The method of claim 21, wherein providing a display command comprises providing a display command to view a variable.

24. A method debugging a computer program comprising:
- recording trace data from an execution of the computer program for a time period, wherein said trace data comprises a record of a sequence of instructions performed by a processor while executing a portion of said computer program, along with a read indicator and one or more affected memory address identifiers for one or more of said instructions that is associated with a read operation, and a write indicator and one or more affected memory address identifiers for one or more of said instructions that is associated with a write operation;
- setting an access breakpoint in the computer program; wherein said access breakpoint is associated with a memory location and is triggered upon detection of an attempt to access said memory location;

simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the same order with respect to the order in which the trace data was recorded until one of a plurality of conditions is met, wherein one of the plurality of conditions is an attempt to access a memory location associated with one or more of a plurality of breakpoints.

25. The method of claim 24, further comprising providing a display command before inputting the start command.

26. The method of claim 25, wherein providing a display command comprises providing a display command to view the contents of a particular memory location.

27. The method of claim 25, wherein providing a display command comprises providing a display command to view a variable.

28. A method of debugging a computer program comprising:

recording trace data from an execution of the computer program for a time period, wherein said trace data comprises a record of a sequence of instructions performed by a process while executing a portion of said computer program, along with a read indicator and one or more affected memory address identifiers for one or more of said instructions that is associated with a read operation;

setting an access breakpoint in the computer program; wherein said access breakpoint is associated with a memory location and is triggered upon detection of an attempt to access said memory location;

simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the reverse order with respect to the order in which the trace data was recorded until one of a plurality of conditions is met, wherein one of the plurality of conditions is an attempt to access a memory location associated with one or more of a plurality of breakpoints.

29. The method of claim 28, further comprising providing a display command before inputting the start command.

30. The method of claim 29, wherein providing a display command comprises providing a display command to view the contents of a particular memory location.

31. The method of claim 29, wherein providing a display command comprises providing a display command to view a variable.

32. A method of debugging a computer program comprising:

recording trace data from an execution of the computer program for a time period, wherein said trace data comprises a record of a sequence of instructions performed by a processor while executing a portion of said computer program, along with a read indicator and one or more affected memory address identifiers for one or more of said instructions that is associated with a read operation;

setting an access breakpoint in the computer program; wherein said access breakpoint is associated with a memory location and is triggered upon detection of an attempt to access said memory location;

simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the same order with respect to the order in which the trace data was recorded until one of a plurality of conditions is met, wherein one of the plurality of conditions is an attempt to access a memory location associated with one or more of a plurality of breakpoints.

33. The method of claim 32, further comprising providing a display command before inputting the start command.

34. The method of claim 33, wherein providing a display command comprises providing a display command to view the contents of a particular memory location.

35. The method of claim 33, wherein providing a display command comprises providing a display command to view a variable.

36. A method of debugging a computer program comprising:

recording trace data from an execution of the computer program for a time period, wherein said trace data comprises a record of a sequence of instructions performed by a processor while executing a portion of said computer program, along with a write indicator and one or more affected memory address identifiers for one or more of said instructions that is associated with a write operation;

setting an access breakpoint in the computer program; wherein said access breakpoint is associated with a memory location and is triggered upon detection of an attempt to access said memory location;

simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the reverse order with respect to the order in which the trace data was recorded until one of a plurality of conditions is met, wherein one of the plurality of conditions is an attempt to access a memory location associated with one or more of a plurality of breakpoints.

37. The method of claim 36, further comprising providing a display command before inputting the start command.

38. The method of claim 37, wherein providing a display command comprises providing a display command to view the contents of a particular memory location.

39. The method of claim 37, wherein providing a display command comprises providing a display command to view a variable.

40. A method of debugging a computer program comprising:

recording trace data from an execution of the computer program for a time period, wherein said trace data comprises a record of a sequence of instructions performed by a processor while executing a portion of said computer program, along with a write indicator and one or more affected memory address identifiers for one or more of said instructions that is associated with a write operation;

setting an access breakpoint in the computer program; wherein said access breakpoint is associated with a memory location and is triggered upon detection of an attempt to access said memory location;

simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the same order with respect to the order in which the trace data was recorded until one of a plurality of conditions is met, wherein one of the plurality of conditions is an attempt to access a memory location associated with one or more of a plurality of breakpoints.

41. The method of claim 40, further comprising providing a display command before inputting the start command.

42. The method of claim 41, wherein providing a display command comprises providing a display command to view the contents of a particular memory location.

43. The method of claim 41, wherein providing a display command comprises providing a display command to view a variable.

44. A method debugging a computer program comprising:

recording trace data from an execution of the computer program for a time period, wherein said trace data comprises a record of a sequence of instructions performed by a processor while executing a portion of said computer program;

setting an access breakpoint in the computer program; wherein said access breakpoint is associated with a memory location and is triggered upon detection of an attempt to access said memory location; and simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the reverse order with respect to the order in which the trace data was recorded until one of a plurality of conditions is met, wherein one of the plurality of conditions is an attempt to access the memory location associated with the access breakpoint.

45. The method of claim 44, further comprising providing a display command before inputting the start command.

46. The method of claim 45, wherein providing a display command comprises providing a display command to view the contents of a particular memory location.

47. The method of claim 45, wherein providing a display command comprises providing a display command to view a variable.

48. A method of debugging a computer program comprising:

recording trace data from an execution of the computer program for a time period, wherein said trace data comprises a record of a sequence of instructions performed by a processor while executing a portion of said computer program;

setting an access breakpoint in the computer program; wherein said access breakpoint is associated with a memory location and is triggered upon detection of an attempt to access said memory location; and simulating a portion of the execution of the computer program as recorded in the trace data in the same order with respect to the order in which the trace data was recorded until detecting an attempt to access a memory location associated with said access breakpoint; and inputting a start command to continue simulating a portion of the execution of the computer program as recorded in the trace data in the same order with respect to the order in which the trace data was recorded until one of a plurality of conditions is met, wherein one of the plurality of conditions is an attempt to access a memory location associated with one or more of a plurality of breakpoints.

49. The method of claim 48, further comprising providing a display command before inputting the start command.

50. The method of claim 49, wherein providing a display command comprises providing a display command to view the contents of a particular memory location.

51. The method of claim 49, wherein providing a display command comprises providing a display command to view a variable.

* * * * *